US012321379B2

(12) United States Patent
Black

(10) Patent No.: US 12,321,379 B2
(45) Date of Patent: Jun. 3, 2025

(54) GENERATING AND COMPRESSING DATA BLOCKS FOR EFFICIENT BROWSE STRUCTURES

(71) Applicant: Ancestry.com Operations Inc., Lehi, UT (US)

(72) Inventor: Russell Lane Black, Provo, UT (US)

(73) Assignee: Ancestry.com Operations Inc., Lehi, UT (US)

( * ) Notice: Subject to any disclaimer, the term of this patent is extended or adjusted under 35 U.S.C. 154(b) by 61 days.

(21) Appl. No.: 18/346,995

(22) Filed: Jul. 5, 2023

(65) Prior Publication Data

US 2024/0012851 A1 Jan. 11, 2024

Related U.S. Application Data

(60) Provisional application No. 63/358,262, filed on Jul. 5, 2022.

(51) Int. Cl.
*G06F 16/54* (2019.01)
*G06F 16/535* (2019.01)

(52) U.S. Cl.
CPC ............ *G06F 16/54* (2019.01); *G06F 16/535* (2019.01)

(58) Field of Classification Search
CPC ............................... G06F 16/54; G06F 16/535
See application file for complete search history.

(56) References Cited

U.S. PATENT DOCUMENTS

| | | | |
|---|---|---|---|
| 10,191,921 B1* | 1/2019 | Can | G06N 3/042 |
| 2004/0139400 A1* | 7/2004 | Allam | G06F 40/106 |
| | | | 715/201 |
| 2008/0059912 A1* | 3/2008 | Scherpa | G06F 3/0481 |
| | | | 715/825 |
| 2009/0178009 A1* | 7/2009 | Dotson | G06F 16/904 |
| | | | 715/854 |
| 2014/0340392 A1* | 11/2014 | Shinohara | H04N 19/44 |
| | | | 345/419 |
| 2019/0068981 A1* | 2/2019 | Chong | H04N 19/184 |
| 2020/0210398 A1* | 7/2020 | Liu | G06F 16/22 |
| 2024/0232156 A1* | 7/2024 | Breitner | G06F 16/2246 |

\* cited by examiner

*Primary Examiner* — Hares Jami
(74) *Attorney, Agent, or Firm* — Keller Preece PLLC

(57) ABSTRACT

The present disclosure is directed toward systems, methods, and non-transitory computer-readable media for determining an in-memory data structure for storing digital images (e.g., newspaper images representing individual pages of digitized newspapers) based on a first level hash and a second level hash that map to nested categories within a browse structure of a genealogical data system. For example, the disclosed systems generate a multilevel data block by implementing one or more compression techniques to reduce overall data size, particularly relating to month data and image/page identification data. In some cases, the disclosed systems greatly reduce the memory and processing requirements of storing, browsing, and searching digital content items (e.g., newspaper images) within a genealogical database.

20 Claims, 14 Drawing Sheets

GENERATING AND COMPRESSING DATA BLOCKS FOR EFFICIENT BROWSE STRUCTURES

CROSS REFERENCE TO RELATED APPLICATIONS

This application claims the benefit of and priority to U.S. Provisional Patent Application No. 63/358,262, filed Jul. 5, 2022, entitled EFFICIENT BROWSE STRUCTURE, which is incorporated herein by reference in its entirety.

FIELD

The disclosed embodiments relate to systems, methods, and/or computer-program products configured for providing, facilitating, and/or executing an efficient browse structure, in particular for historical record collections.

BACKGROUND

Many existing genealogical research systems provide repositories of information stored in databases and are configured to allow connected devices to search and browse for information stored within the repositories. However, given the scale of genealogical databases, which may include tens of billions of distinct historical records (including newspaper images), storing and maintaining databases at this scale is a technologically complicated task, especially when facilitating access to (and providing) stored data to large numbers of connected devices worldwide. The computational requirements in processing power and memory for accessing stored historical records are especially pronounced during times of high network traffic. Consequently, many existing systems exhibit a number of deficiencies or drawbacks, particularly regarding computational efficiency and reliability.

As just suggested, some existing genealogical research systems inefficiently consume computing resources, expending excessive amounts of processing power and memory that could otherwise be preserved with more efficient systems. To elaborate, many existing systems rely on a conventional disk-based database architecture to facilitate search functionalities and browse functionalities together. However, given the enormity of the data within genealogical databases and the limited speeds of disk-based storage servers, existing systems often struggle to quickly generate and provide search results and/or browse results (e.g., to achieve a threshold latency). For instance, depending on the amount of network traffic at the time of a browse request or a search request, the data storage protocols of conventional servers used by existing systems can cause slowdowns (or network crashes) as these systems process many requests to search and browse through a genealogical database. Thus, not only are some existing systems computationally inefficient, but existing systems are often unreliable as well.

SUMMARY

This disclosure describes one or more embodiments of systems, methods, and non-transitory computer-readable storage media that provide benefits and/or solve one or more of the foregoing and other problems in the art. In particular, the disclosed systems can determine an in-memory data structure for storing digital images (e.g., newspaper images representing individual pages of digitized newspapers) based on a first level hash and a second level hash that map to nested categories within a browse structure of a genealogical data system. For example, the disclosed systems generate a multilevel data block by implementing one or more compression techniques to reduce overall data size, particularly relating to month data and image/page identification data. In some cases, the disclosed systems greatly reduce the memory and processing requirements of storing, browsing, and searching digital content items (e.g., newspaper images) within a genealogical database.

BRIEF DESCRIPTION OF THE DRAWINGS

The detailed description refers to the drawings briefly described below.

DETAILED DESCRIPTION

Figure 1:
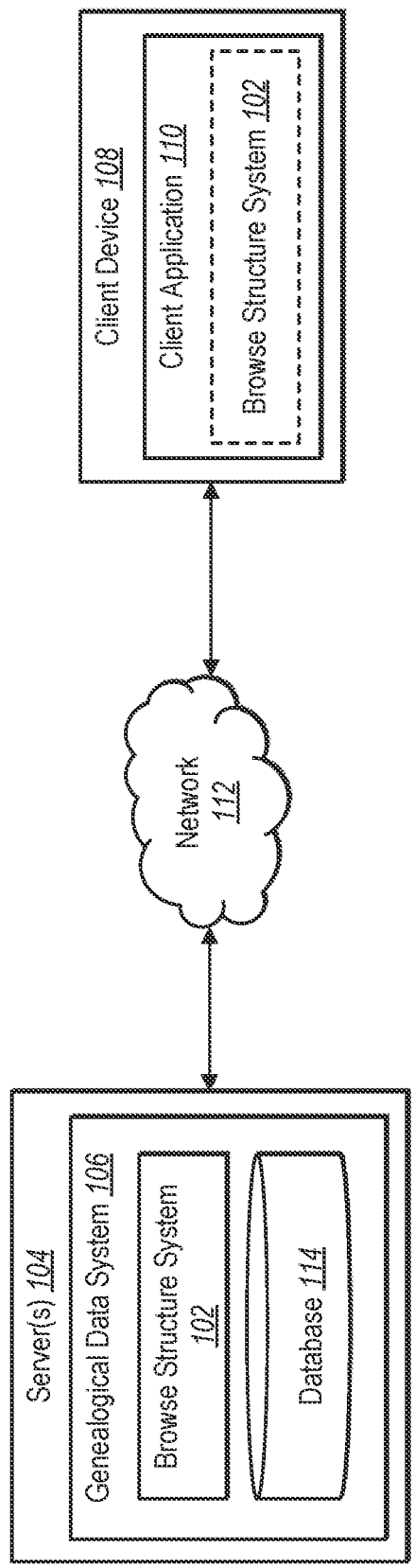
FIG. 1 illustrates a block diagram of a system environment including a browse structure system in accordance with one or more embodiments.

This disclosure describes one or more embodiments of a browse structure system that can generate and provide multilevel data blocks that encode data of digital images (e.g., newspaper image) for fast, efficient storage and access. In many use cases, user accounts of genealogical content systems use client devices to search and/or browse genealogical databases for genealogical content items (e.g., digitized newspaper articles, images, census records, obituaries, court documents, military records, immigration records, and other types of digitized historical documents) to identify family members to link within genealogical trees stored within one or more genealogical tree databases and/or to add genealogical content items to existing nodes within genealogical trees. As part of this process, the browse structure system can generate multilevel data blocks for efficiently storing and accessing (genealogical) content items, such as newspaper images, according to an in-memory data structure and one or more compression techniques.

To facilitate identifying and providing targeted/relevant genealogical content items, such as newspaper images, the browse structure system can generate and maintain a genealogical database that stores a repository of genealogical content items (including newspaper images). More specifically, the browse structure system can utilize a genealogical database that contains or stores billions of genealogical content items that are searchable and displayable on a client device. As part of the genealogical database, the browse structure system can structure (or restructure) the storage of newspaper images (and/or other content items) according to an in-memory data structure that operates much faster than conventional server databases, while still supporting sharding and replication. Indeed, the browse structure system can generate multilevel data blocks for newspaper images to reduce storage and processing requirements using the in-memory data structure and one or more compression techniques (discussed in further detail below). Thus, in response to a browse request (or a search query), the browse structure system can access a stored newspaper image by identifying its corresponding multilevel data block within an in-memory data server (e.g., a REDIS server).

As just suggested, the browse structure system can identify a newspaper image (or some other digital image depicting digitized content) as part of a browse structure. For example, the browse structure system can identify a newspaper image within a hierarchy of nested categories of a browse structure for browsing digital content items, such as newspaper images. In some cases, a browse structure includes category-specific browse trees for each layer/level of the browse structure, where selecting a category within one browse tree opens a successive browse tree that includes additional sub-categories within the selected category.

As mentioned, the browse structure system can determine an in-memory data structure for storing newspaper images within a newspaper image database arranged according to the browse structure. For instance, the browse structure system can determine the in-memory data structure in the form of a multilevel hash (e.g., a multilevel REDIS hash) that includes a first level hash and a second level hash. Within the first level hash, the browse structure system can generate a key, a field, and a value for mapping a newspaper image to a first set of browse levels/categories (e.g., within the hierarchy of nested categories of a browse structure). Additionally, the browse structure system can generate a second level hash to include a key, a field, and a value for mapping the newspaper image to a second set of browse levels/categories.

In some embodiments, the browse structure system generates a multilevel data block to represent a newspaper image (or some other digital image) within a database (e.g., within an in-memory data server). For example, the browse structure system can generate a multilevel data block according the in-memory data structure of hashes. In some cases, the multilevel data block includes a first level of data corresponding to the first level hash and further includes a second level of data corresponding to the second level hash. The browse structure system can further utilize one or more compression techniques to compress the data associated with a newspaper image for the multilevel data block. As described in further detail below, the compression techniques include month data compression and page identification compression for reducing the size of month data and page identification data for a newspaper image.

As suggested above, the browse structure system can provide improvements or advantages over existing genealogical research systems. For example, the browse structure system can improve computational efficiency over prior systems in storing and accessing data for newspaper images (or other digital images). Indeed, while some prior systems inefficiently store and access newspaper images (and other digital content) using conventional server databases and conventionally indexed data, the browse structure system utilizes a more sophisticated in-memory data server and one or more unique compression techniques to generate multilevel data blocks that efficiently encode data, such as newspaper image data.

For instance, by determining an in-memory data structure based on multiple hash levels for encoding image data, the browse structure system greatly reduces the file size of newspaper images (or other digital images). Additionally, by implementing data compression algorithms for reducing the size of month-specific data and page identification data, the browse structure system further reduces file size by a significant degree. As a result, the browse structure system not only preserves memory that would otherwise be consumed by prior systems in storing content items such as newspaper images, but the browse structure system also greatly reduces the processing requirements for executing search requests and/or browse requests (e.g., due to the speed of the in-memory data structure). Consequently, the browse structure system is also more reliable than prior systems as well, especially in situations with high network traffic. Indeed, because the multilevel data blocks reduce computing requirements so much, the browse structure system can much more reliably execute searches and browses for client devices without network slowdowns or crashes. Empirical data supporting the computational improvements of the browse structure system is provided below with reference to the figures.

As illustrated by the foregoing discussion, the present disclosure utilizes a variety of terms to describe features and benefits of the browse structure system. Additional detail is hereafter provided regarding the meaning of these terms as used in this disclosure. Further, while this disclosure focuses primarily on genealogical content, the browse structure system can perform one or more of the processes described herein to provide a hybrid search-and-browse interface in the context of other types of digital content items as well. As used herein, the term "genealogical content item" (or simply "content item") refers to a digital object or a digital file that includes information (e.g., genealogical information) interpretable by a computing device (e.g., a client device) to present information to a user. A genealogical content item can include a file such as a digital text file, a digital image file, a digital audio file, a webpage, a website, a digital video file, a web file, a link, a digital document file, or some other type of file or digital object. A genealogical content item can have a particular file type or file format, which may differ for different types of digital content items (e.g., digital documents, digital images, digital videos, or digital audio files). In some cases, a genealogical content item can refer to a content item that includes or depicts historical or genealogical information, such as a digitized newspaper article, a digitized photograph of a relative, a digitized census record, a digitized obituary, a digitized court document, a digitized DNA analysis, a digitized military record, a digitized immigration record, or a digitized family tree. In some embodiments, a genealogical content item includes a content item selected or identified to recommend to a user account, such as a record hint (e.g., a stored genealogical content item), a digital story (e.g., a stored collection of genealogical content items arranged for a particular person, topic, or entity of a genealogical data system), a digital image (e.g., a digitized photograph), a new person hint (e.g., a node to add to a genealogical tree), a member tree hint (e.g., a prediction for correcting a node within a genealogical tree of a user account), or a DNA match (e.g., a record indicating a DNA match of a user account to a relative whose information is stored in a genealogical data system).

In some embodiments, a genealogical content item can include a newspaper image. As used herein, the term "newspaper image" refers to a digital image depicting digitized newspaper content. For example, a newspaper image includes a high-resolution (e.g., 5000×7000 pixels) resolution image captured from a historical newspaper (e.g., from the 1700s or 1800s) and whose pixels depict digitized newspaper content for a single page of a newspaper or as a combination of various pages of the newspaper in a single image. In some cases, a newspaper image has a columnar arrangement of newspaper content, where articles and advertisements are included in one or more columns of the image.

As mentioned, in some embodiments, the browse structure system determines or identifies newspaper images with a browse structure. As used herein, the term "browse structure" refers to a hierarchical organization of nested content items or nested content item categories. In some cases, a browse structure is navigable to access a series of browse trees specific to respective content categories, where each successive category/browse tree drills down on content items (e.g., newspaper images) within a category of a previous browse tree. In some cases, a browse structure for storing newspaper images includes the following hierarchy: country→state→city→newspaper (title)→year→month-→date (day of month)→page identifier/identification. Each level of the hierarchy can correspond to its own respective browse tree and can be navigable to access the next level of the browse structure within a subsequent browse tree.

In some embodiments, the browse structure system determines an in-memory data structure for storing newspaper images (or other digital images). As used herein, the term "in-memory data structure" refers to a computer data storage paradigm that uses computer memory (e.g., random access memory or RAM) to store and access data rather than disk-based data storage structures. As a result, an in-memory data structure is much faster than conventional disk-based data storage. In certain embodiments, an in-memory data structure includes, or is defined by, a multilevel data hash that includes a first level hash and a second level hash. In some cases, computer memory (e.g., RAM) is scarcer than disk storage, and the browse structure system accounts for the potentially limited storage space in memory by generating multilevel data blocks using compression algorithms to greatly reduce file sizes for newspaper images. For example, an in-memory data structure can include the structure defined and utilized by REDIS servers (or other in-memory data servers) for storing and accessing data using computers and computer networks.

Relatedly, the term "multilevel data hash" refers to a data hash (e.g., a function or algorithm for mapping data to fixed-size values) that includes multiple levels or multiple hashes, including a first hash level and a second hash level. For example, a multilevel data hash includes a first level hash of a first key, a first field, and a first value that map a newspaper image to a first set of levels within a hierarchy of a browse structure (e.g., the levels of: newspaper (title) →year→month). A multilevel hash can also include a second level hash of a second key, a second field, and a second value that map a newspaper image to a second set of levels within a hierarchy of a browse structure (e.g., the levels of: newspaper (title)/year/month→date (day of the month) →page identifier). Indeed, in some cases, a multilevel data hash refers to a REDIS hash (or a combination of multiple REDIS hashes) that includes a hash key, a field, and a value that make up the hash.

Along these lines, the term "multilevel data block" refers to a block (e.g., a set of bits or bytes) of computer data that is arranged or organized in multiple levels according to a multilevel hash of an in-memory data structure. For example, a multilevel data block refers to a compressed set of computer data that represents a newspaper image (or some other digital image) for storage within an in-memory data server. In some cases, a multilevel data block includes computer data for a first level hash and a second level hash, where some or all of the data is compressed according to one or more compression algorithms described herein.

In some embodiments, compressing data for a multilevel data block involves determining page gaps and/or gap deltas. As used herein, the term "page gap" (or simply "gap") refers to a numerical gap or spacing between the numbers or numerals representing consecutive or successive newspaper images (or newspaper pages) as stored in a database. For example, a gap refers to a difference between a first page identifier for a first newspaper image uploaded to a database and a second page identifier for a second newspaper image uploaded to the database (e.g., the difference between page identifier 404656112 and page identifier 404656118, where the different is 6). Relatedly, as used herein, the term "gap delta" refers to a difference between consecutive or successive page gaps corresponding to a series of newspaper images/pages. For example, a gap delta indicates changes in gap sizes between page identifiers. Given a series of page identifiers for newspaper images of: 404656112, 404656118, 404656120, and 404656124, the browse structure system determines gaps of 6, 2, and 4 and further determines gap deltas of −4 and 2, where −4 indicates the difference between the first gap of 6 and the second gap of 2, and 2 indicates the difference between the second gap of 2 and the third gap of 4.

Additional detail regarding the browse structure system will now be provided with reference to the figures. For example, FIG. 1 illustrates a schematic diagram of an example system environment for implementing a browse structure system 102 in accordance with one or more implementations. An overview of the browse structure system 102 is described in relation to FIG. 1. Thereafter, a more detailed description of the components and processes of the browse structure system 102 is provided in relation to the subsequent figures.

As shown, the environment includes server(s) 104, a client device 108, a database 114, and a network 112. Each of the components of the environment can communicate via the network 112, and the network 112 may be any suitable network over which computing devices can communicate. Example networks are discussed in more detail below in relation to FIGS. 11-12.

As mentioned above, the example environment includes a client device 108. The client device 108 can be one of a variety of computing devices, including a smartphone, a tablet, a smart television, a desktop computer, a laptop computer, a virtual reality device, an augmented reality device, or another computing device as described in relation to FIGS. 11-12. The client device 108 can communicate with the server(s) 104 and/or the database 114 via the network 112. For example, the client device 108 can receive user input from respective users interacting with the client device 108 (e.g., via the client application 110) to, for instance, search for, access, generate, modify, or share a genealogical content item and/or to interact with a browse tree within a browse structure within a graphical user interface of the genealogical data system 106. In addition, the browse structure system 102 on the server(s) 104 can receive information relating to various searches or browses for, or interactions with, genealogical content items (e.g., newspaper images), and/or user interface elements based on the input received by the client device 108.

As shown, the client device 108 can include a client application 110. In particular, the client application 110 may be a web application, a native application installed on the client device 108 (e.g., a mobile application, a desktop application, etc.), or a cloud-based application where all or part of the functionality is performed by the server(s) 104. Based on instructions from the client application 110, the client device 108 can present or display information, including a user interface such as a browse structure interface or some other graphical user interface, as described herein.

As illustrated in FIG. 1, the example environment also includes the server(s) 104. The server(s) 104 may generate, track, store, process, receive, and transmit electronic data, such as genealogical content items (e.g., newspaper images), search queries, browse tree interactions, browse results, and/or interactions with content items. For example, the server(s) 104 may receive data from the client device 108 in the form of a browse request. In addition, the server(s) 104 can transmit data to the client device 108 in the form of a browse tree including content items or categories of content items within a browse structure interface. Indeed, the server(s) 104 can communicate with the client device 108 to send and/or receive data via the network 112. In some implementations, the server(s) 104 comprise(s) a distributed server where the server(s) 104 include(s) a number of server devices distributed across the network 112 and located in different physical locations. The server(s) 104 can comprise one or more content servers, application servers, communication servers, web-hosting servers, machine learning server, and other types of servers.

As shown in FIG. 1, the server(s) 104 can also include the browse structure system 102 as part of a genealogical data system 106. The genealogical data system 106 can communicate with the client device 108 to perform various functions associated with the client application 110 such as managing user accounts, managing genealogical data, managing genealogy trees, managing genealogical content items, and facilitating user interaction with, and sharing of, the genealogy trees and/or genealogical content items. Indeed, the genealogical data system 106 can include a network-based cloud storage system to manage, store, and maintain genealogical content items and genealogy trees related data user accounts. For instance, the genealogical data system 106 can utilize genealogical data across various content items and user accounts to generate and maintain a universal genealogy tree that reflects the relatedness or consanguinity between nodes corresponding to all user accounts and other individuals indicated by stored genealogical content items (e.g., within the database 114). In some embodiments, the browse structure system 102 and/or the genealogical data system 106 utilize the database 114 to store and access information such as genealogical content items, genealogy trees, user account data, and/or other information.

As further illustrated in FIG. 1, the browse structure system 102 includes a database 114 that stores genealogical content items, such as newspaper images. In particular, the browse structure system 102 stores genealogical content items and accesses the genealogical content items to generate search results and browse trees. For instance, the browse structure system 102 receives a browse request from the client device 108 and generates a browse tree that includes categories of content items defined by a category within a hierarchy of a browse structure for drilling down into additional browse trees according to narrower categories.

Although FIG. 1 depicts the browse structure system 102 located on the server(s) 104, in some implementations, the browse structure system 102 may be implemented by (e.g., located entirely or in part on) one or more other components of the environment. For example, the browse structure system 102 may be implemented in whole or in part by the client device 108. For example, the client device 108 and/or a third-party system can download all or part of the browse structure system 102 for implementation independent of, or together with, the server(s) 104.

In some implementations, though not illustrated in FIG. 1, the environment may have a different arrangement of components and/or may have a different number or set of components altogether. For example, the client device 108 may communicate directly with the browse structure system 102, bypassing the network 112. As another example, the environment may include multiple client devices, each associated with a different user account. In addition, the environment can include the database 114 located external to the server(s) 104 (e.g., in communication via the network 112) or located on the server(s) 104 and/or on the client device 108.

Figure 2:
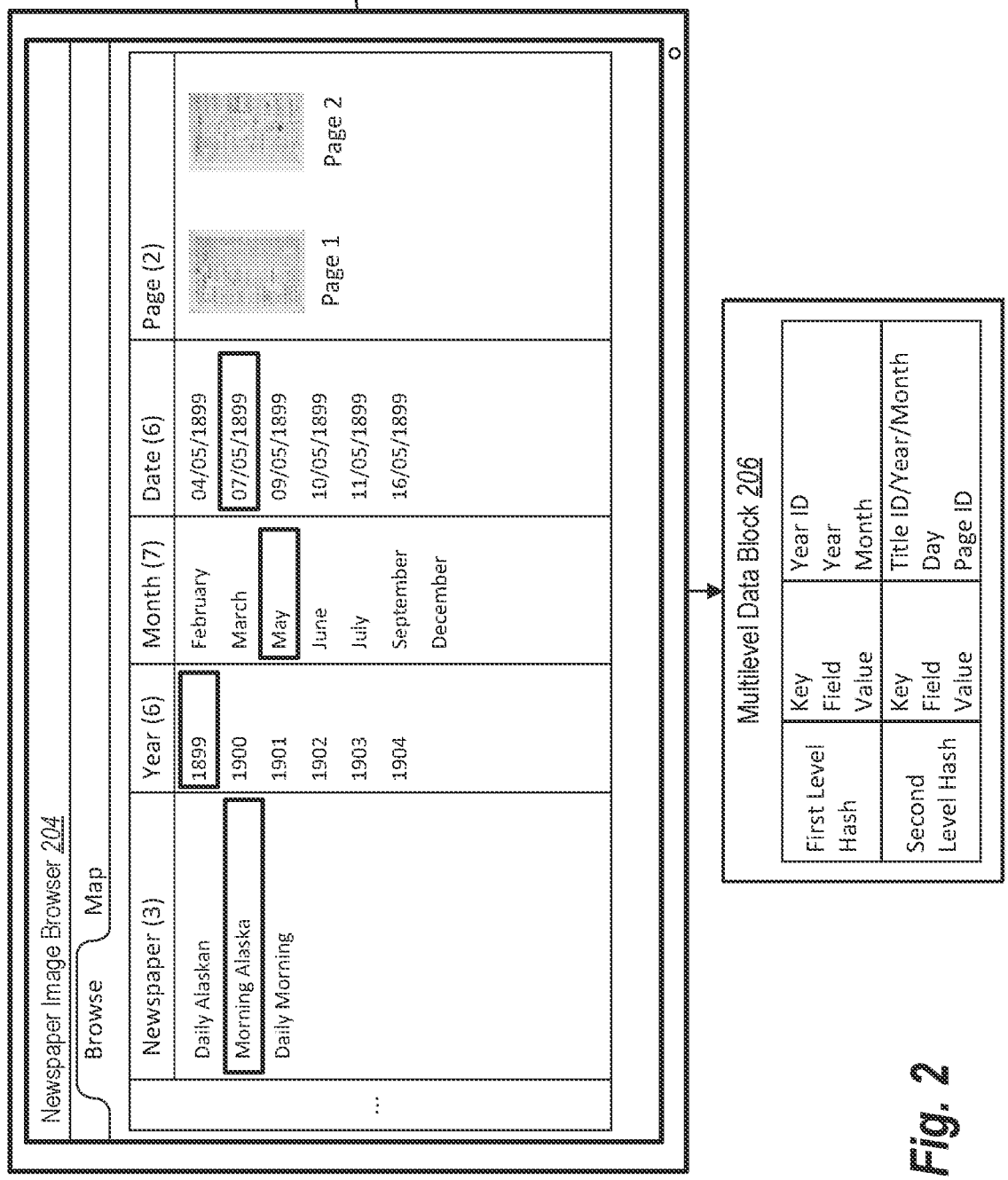
FIG. 2 illustrates an overview of generating and storing a multilevel data block in accordance with one or more embodiments.

As mentioned above, the browse structure system 102 can generate multilevel data blocks based on a browse structure for browsing through digital content items, such as newspaper images. In particular, the browse structure system 102 can generate a multilevel data block that encodes a newspaper image according to an in-memory data structure that maps data to categories within the browse structure. FIG. 2 illustrates an overview of generating a multilevel data block for a newspaper image in accordance with one or more embodiments. Additional detail regarding the various acts and processes described in relation to FIG. 2 is provided thereafter with reference to subsequent figures.

As illustrated in FIG. 2, the browse structure system 102 generates and provides a browse structure interface 204 for display on a client device 202 (e.g., the client device 108). More specifically, the browse structure system 102 generates the browse structure interface 204 to include a number of browse trees, each browse tree corresponding to a specific level or category of data within the browse structure and including selectable options for drilling down into narrower levels/categories within subsequent browse trees. As shown, the browse structure interface 204 includes browse trees for different categories or levels of data, including "Newspaper," "Year," "Month," "Date," and "Page." As also shown (e.g., by the ellipsis to the left of the "Newspaper" browse tree), the browse structure interface 204 can include additional browse trees for higher-level categories within the browse structure hierarchy. Indeed, the browse structure interface 204 can include an overall browse structure of country→state→city→newspaper (title)→year→month- →date (day of month)→page identifier/identification, where each level corresponds to its own browse tree.

As further illustrated in FIG. 2, the browse structure system 102 generates a multilevel data block 206 for a newspaper image. For instance, the browse structure system 102 generates the multilevel data block 206 to encode data for the "Page 1" newspaper image and/or the "Page 2" newspaper image depicted within the browse structure interface 204. To generate the multilevel data block 206, the browse structure system 102 determines an in-memory data structure that defines how to organize encoded data within the multilevel data block 206. More particularly, the browse structure system 102 determines an in-memory data structure that includes a first level hash and a second level hash.

Within the first level hash, the browse structure system 102 generates or defines a key, a field, and a value. Specifically, the browse structure system 102 leverages the structure of in-memory data hashes (e.g., REDIS hashes) to define the key, field, and value within a first level hash such that they map to specific categories or levels within the hierarchy of a browse structure. To elaborate, the browse structure system 102 maps the key to the title identifier (e.g., the newspaper name) of a newspaper image, such that the key indicates the name of the newspaper indicated by the "Newspaper" browse tree in the browse structure interface 204 (e.g., "Morning Alaska"). In addition, the browse structure system 102 maps the field portion of the first level hash to year data for the newspaper image, such that the field includes encoded data for the "Year" level in the browse structure. Further, the browse structure system 102 maps the value portion of the first level hash to month data of the newspaper image, such that the value includes encoded data for the "Month" level of the browse structure.

Within the second level hash, the browse structure system 102 generates another key, another field, and another value. In particular, the browse structure system 102 utilizes the second level hash to encode newspaper image data for additional browse structure levels not encompassed or encoded by the first level hash. Specifically, the browse structure system 102 maps the second level key to a hybrid combination of browse structure levels, including the title identifier, the year data, and the month data of the newspaper image (e.g., as defined by the key, field, and value of the first level hash). In addition, the browse structure system 102 maps the second level field to day data (or date data) of the newspaper image, such that the field encodes data for the "Date" level of the browse structure. Further, the browse structure system 102 maps the second level value to page identifier data of the newspaper image, such that the value encodes data for the "Page" level of the browse structure (e.g., to indicate the actual page identifier for the particular newspaper image).

While the description of FIG. 2, as well as that of the subsequent figures, relates primarily to newspaper images, the browse structure system 102 can perform similar processes and functions on other types of digital content items (e.g., genealogical content items) as well. For example, the browse structure system 102 can generate multilevel data blocks to represent digital content items such as digitized versions (e.g., images) of census records, financial documents, medical records, legal documents, military records, or other content items that can be discretized and represented using content-item-specific identifiers (e.g., consecutive, or sequential, numerical identifiers). Indeed, the browse structure system 102 can determine an in-memory data structure (including a first level hash and a second level hash) for a digital content item and can further encode content item data into the first level hash and the second level hash. In some cases, the browse structure system 102 can utilize more or fewer hash levels, depending on the depth of a browse structure for navigating the particular type of content item.

For instance, the browse structure system 102 can determine a number of layers or browse trees associated with a content item, and the browse structure system 102 can determine an in-memory data structure to accommodate the number of layers. In addition, the browse structure system 102 can encode the layers of the browse structure into REDIS hashes (or other in-memory hashes) that include keys, fields, and values. Specifically, the browse structure system 102 can assign keys, fields, and values to respective layers of the browse structure. For instance, if a military record includes one layer for military branch, another for a particular geographic region, another for a particular regiment, another for service year, and another for personnel records, the browse structure system 102 can use a two-level in-memory data structure and can assign hash parameters as follows: i) first level hash→military branch, ii) first level field→geographic region, iii) first level value→regiment, iv) second level key→branch/region/regiment, v) second level field→service year, vi) second level value→personnel record identifiers.

Further, the browse structure system 102 can compress data within one or more of the hash levels. For example, the browse structure system 102 can compress year data (or month data or other date data) into binary values to reduce data size by converting decimal date representations to binary, thus requiring fewer bits. Additionally, the browse structure system 102 can encoder personnel record identifiers (or other numerical identifiers for different types of content items) by determining and encoding gaps between successive or adjacent numerical identifiers. The browse structure system 102 can further determine gap deltas and can use zigzag encoding and/or SIMPLE-8b encoding to compress gap deltas into 64-bit blocks (or some other encoding to similarly reduce the data size of representing gap deltas). In some cases, the browse structure system 102 further utilizes a byte alignment padding to align data on byte boundaries. Indeed, the browse structure system 102 can apply the compression algorithms described in relation to subsequent figures for compression content item data other than (e.g., in addition to) newspaper image data.

Figure 3A:
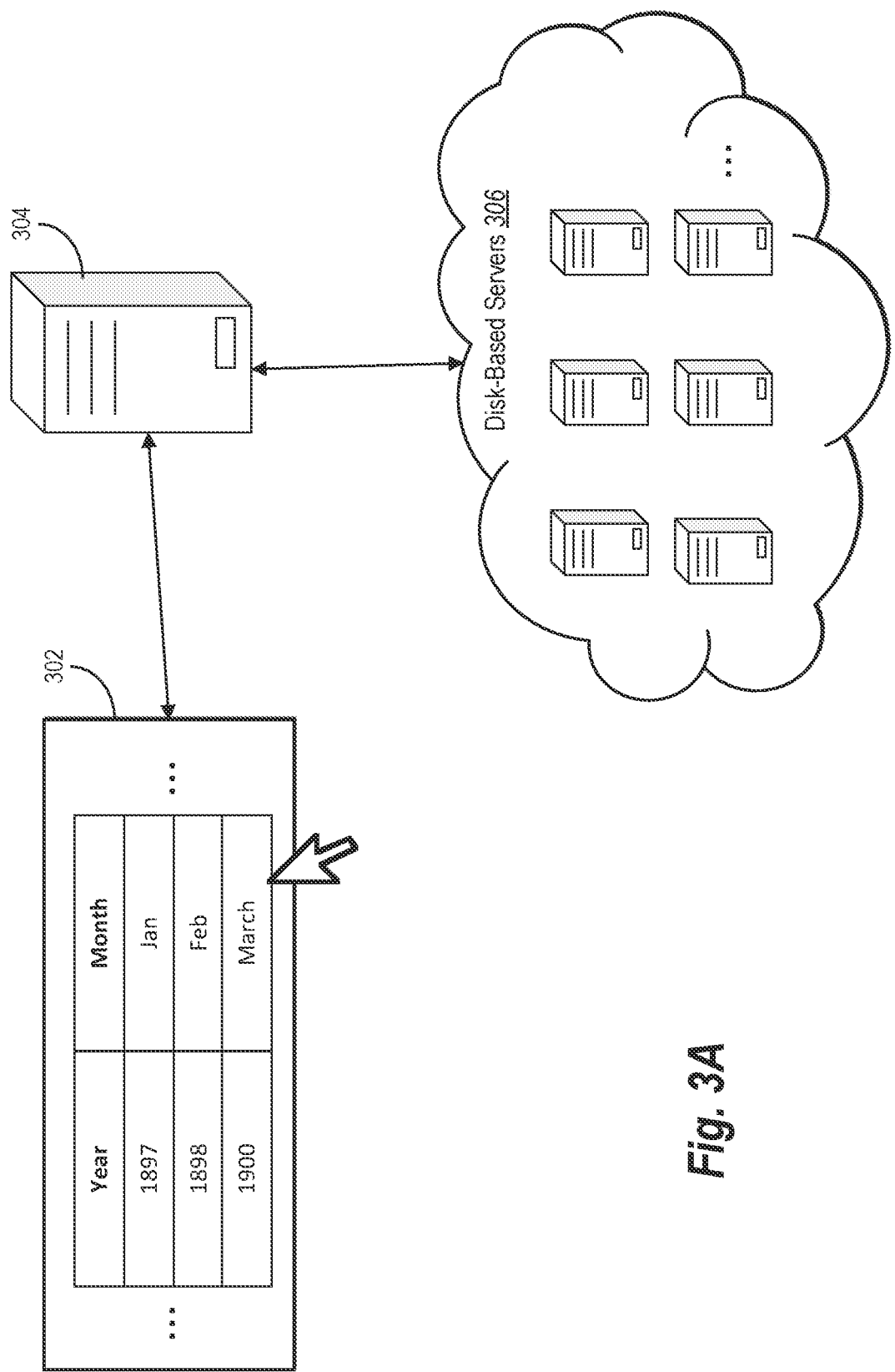
FIGS. 3A-3B illustrate example diagrams for transitioning from using many disk-based data servers to a single in-memory data server in accordance with one or more embodiments.
Figure 3B:
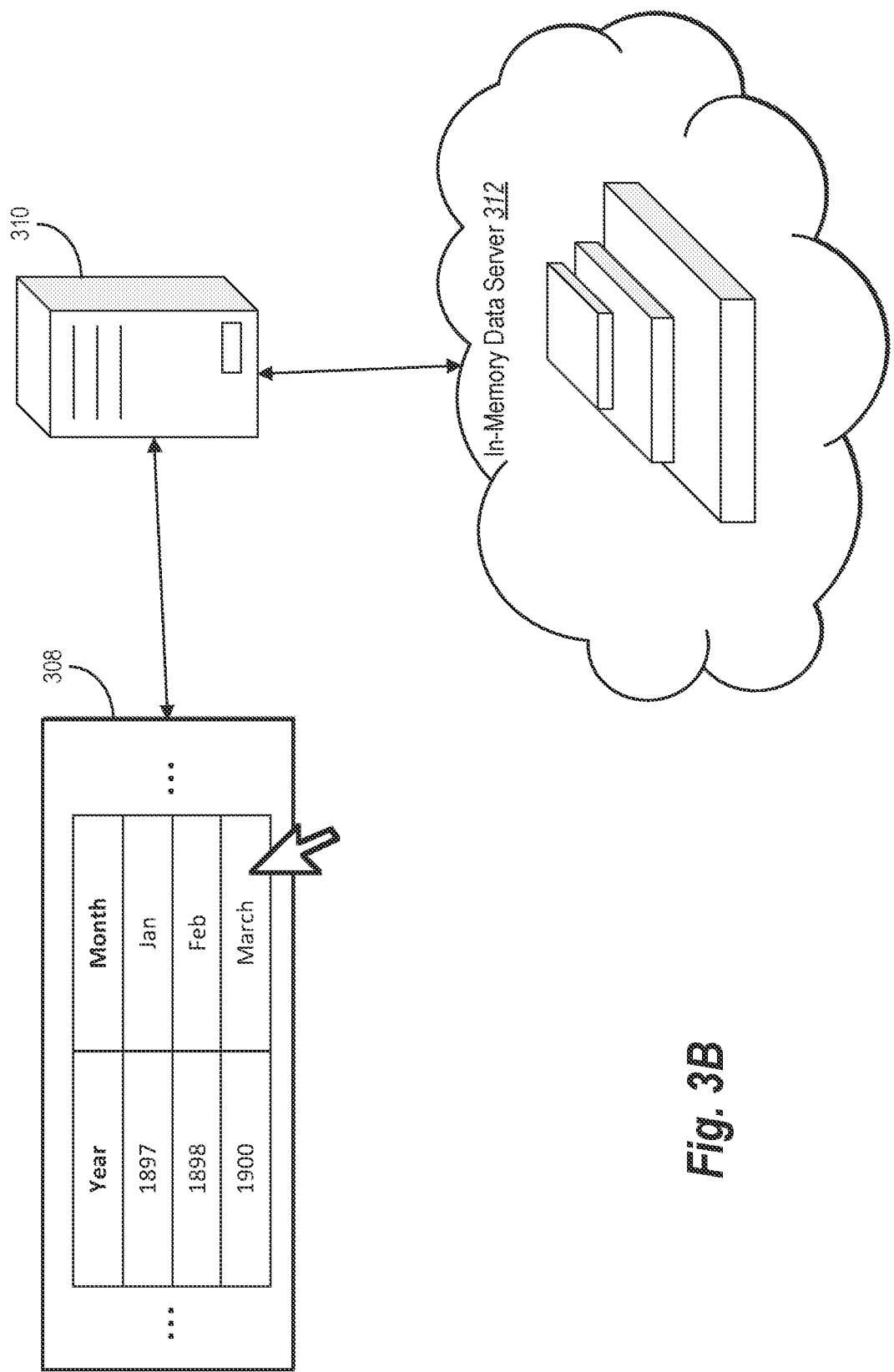

As mentioned above, in certain embodiments, the browse structure system 102 stores a multilevel data block within an in-memory data server to increase speed and decrease latency in accessing stored data, such as newspaper images. Indeed, by generating multilevel data blocks that greatly reduce the storage requirements of newspaper images, the browse structure system 102 can leverage the functional improvements of in-memory data servers, such as REDIS, to reduce latency in retrieving requested data for browses and/or searches. FIGS. 3A-3B illustrate example diagrams for comparing the use of disk-based servers and in-memory data servers in accordance with one or more embodiments.

As illustrated in FIG. 3A, the browse structure system 102 can receive a browse request from a client device. In particular, the browse structure system 102 can receive an indication of a user interaction selecting a particular element within a browse tree (e.g., the "March" element within the "Month" tree) of a browse structure interface 302. Based on the browse request, the browse structure system 102 can further process the request at a computing device 304 (e.g., a local device and/or a server device hosting the genealogical data system 106, such as the server(s) 104). Indeed, the browse structure system 102 can process the request to determine that the selection of the "March" element requires accessing content items (e.g., newspaper images) and/or browse structure categories within the selected "March" category.

For example, the browse structure system 102 can access network servers that store or house the requested data to provide to the client device. As shown, in certain embodiments, the browse structure system 102 can utilize many (e.g., hundreds of) disk-based servers 306 to store and access combined data for a browse structure together with a search index. While the multilevel data block still provides improvements in reducing storage requirements (e.g., resulting in requiring fewer disk-based data servers), additional improvements are possible by replacing at least a portion of the disk-based servers 306 (e.g., those of the disk-based servers 306 that host browse data) with an in-memory data server. Indeed, in-memory data servers can access and store data much faster than disk-based data servers.

To elaborate, as illustrated in FIG. 3B, instead of using many disk-based servers to store and access newspaper images (or other digital content), the browse structure system 102 can utilize a single in-memory data server 312 (or two for redundancy and reliability). Indeed, by encoding newspaper image data within multilevel data blocks, the browse structure system 102 greatly reduces the storage size of newspaper image data, therefore achieving data sizes storable within a single in-memory data server 312, as opposed to multiple disk-based data servers. Thus, in response to a user interaction within the browse structure interface 308, the browse structure system 102 can process the request using a computing device 310 (e.g., a local device and/or a server device hosting the genealogical data system 106, such as the server(s) 104) and can access the requested data from the in-memory data server 312. Additional detail regarding the size reduction and efficiency gains is provided below with reference to subsequent figures.

Figure 4:
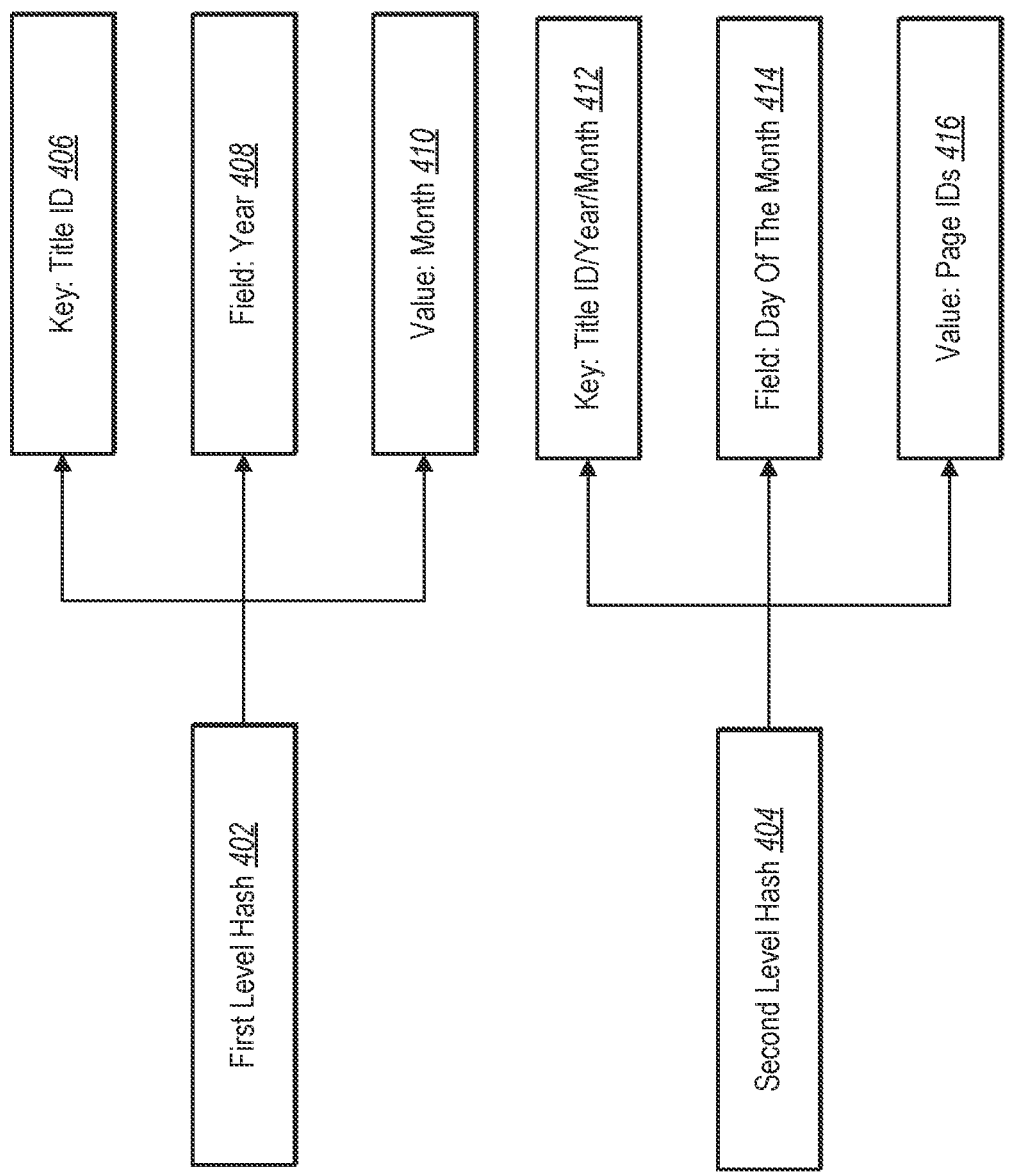
FIG. 4 illustrates an example diagram for determining an in-memory data structure including a first level hash and a second level hash in accordance with one or more embodiments.

As noted above, in certain described embodiments, the browse structure system 102 determines an in-memory data structure for storing data for a browse structure. In particular, the browse structure system 102 can determine an in-memory data structure that includes, or is defined by, a first level hash and a second level hash, where each hash includes respective keys, fields, and values. FIG. 4 illustrates an example diagram for determining an in-memory data structure in accordance with one or more embodiments.

As illustrated in FIG. 4, the browse structure system 102 determines or generates a first level hash 402 for a newspaper image (or for a set of newspaper images). More specifically, the browse structure system 102 generates the first level hash 402 to include a key 406, a field 408, and a value 410. Indeed, the browse structure system 102 encodes a portion of the newspaper image data into the first level hash 402 by mapping data for a first set of browse structure levels to the first level hash 402. Particularly, the browse structure system 102 maps a title identifier (e.g., the name of a newspaper publication) to the key 406. Within the browse structure, a title identifier includes sub-categories of publication years, where each year includes further sub-categories of months in which the particular newspaper was published. Thus, the browse structure system 102 can encode the year data into the field 408 of the first level hash 402 to account for the year-specific sub-categories within the title identifier. Additionally, the browse structure system 102 can encode the month data into the value 410 of the first level hash 402 to account for the month-specific sub-categories within the year level of the browse structure. In some cases, the browse structure system 102 generates the first level hash 402 using the following code for REDIS hashes:

redis:6379>HSET 28586 1901 1, 2, 3, 4, 5, 6, 7, 8, 9, 10, 11, 12 where 28586 represents the title identifier of a newspaper publication encoded as the key 406, 1901 represents a year encoded as the field 408, and 1, 2, 3, 4, 5, 6, 7, 8, 9, 10, 11, 12 represent months encoded as values (e.g., the value 410).

As further illustrated in FIG. 4, the browse structure system 102 determines or generates a second level hash 404 for a newspaper image (or a set of newspaper images). More particularly, the browse structure system 102 generates the second level hash 404 to include a key 412, a field 414, and a value 416. Indeed, the browse structure system 102 encodes a portion of the newspaper image data into the second level hash 404 by mapping data for a second set of browse structure levels to the second level hash 404. Particularly, the browse structure system 102 maps data of the first level hash 402—e.g., the title identifier, the year, and the month—to the key 412. In addition, the browse structure system 102 maps narrower levels of the browse structure to the field 414 and the value 416. For instance, the browse structure system 102 maps day or date data (e.g., day of the month) to the field 414 and further maps page identifier data to the value 416. In some cases, the browse structure system 102 generates the first level hash 402 using the following code for REDIS hashes:

redis:6379>HSET 28586/1901/7 14 404666197, 404666205, 404666212 where 28586/1901/7 represents the title identifier/year/month of a newspaper publication encoded as they key 412, 14 represents a day of the month encoded as the field 414, and 404666197, 404666205, 404666212 represent individual page identifiers specific to individual newspaper images encoded as values (e.g., the value 416).

By encoding newspaper image data into the in-memory data structure including the first level hash 402 and the second level hash 404, the browse structure system 102 reduces the size of image data. Specifically, the browse structure system 102 reduces the number of keys (e.g., REDIS keys) by around 30 times compared to prior systems that utilize set-based storage architectures (e.g., REDIS sets). Particularly, encoding day data into a field (as opposed to a key) reduces the number of keys required to encode the information by a large factor, due at least in part to the fact that months include an average of about 30 days. Such a reduction in the number of keys further results in a significant reduction in storage size, as REDIS keys are accompanied by storage overhead (e.g., around 50 bytes of data per key) required to store and manage keys.

Figure 5:
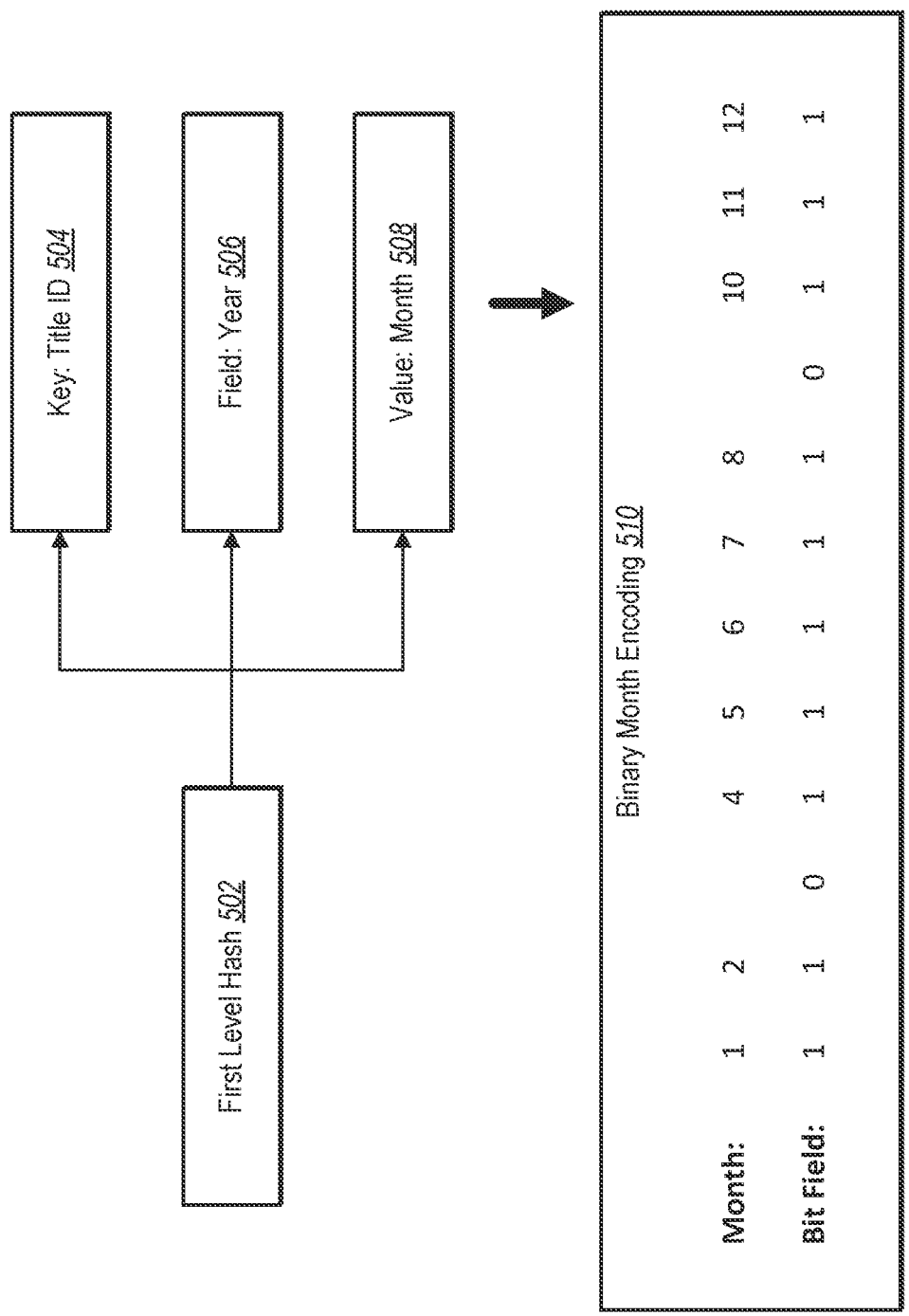
FIG. 5 illustrates an example diagram for compressing month data as part of a multilevel data block in accordance with one or more embodiments.

As mentioned above, in certain described embodiments, the browse structure system 102 compresses newspaper image data to generate a multilevel data block. In particular, the browse structure system 102 generates a multilevel data block by compressing month data within the first level hash of the in-memory data structure. FIG. 5 illustrates an example diagram for compressing month data for a multilevel data block in accordance with one or more embodiments.

As illustrated in FIG. 5, the browse structure system 102 compresses or encodes data within a first level hash 502 for a newspaper image. More specifically, the browse structure system 102 compresses the value 508 (or a set of values) to reduce the size of the data for the multilevel data block. As shown, the first level hash 502 includes a key 504, a field 506, and a value 508, as described in further detail above.

As further illustrated in FIG. 5, the browse structure system 102 utilizes a binary month encoding 510 to encode or compress the month data for the value 508. To elaborate, the browse structure system 102 identifies values included in the month data within a particular year for a newspaper publication and encodes the months in binary, where a 1 indicates that the newspaper published an issue that month and a 0 indicates that the newspaper did not publish an issue that month (or vice-versa). As shown, the browse structure system 102 determines that a newspaper published issues in months 1, 2, 4, 5, 6, 7, 8, 10, 11, and 12 in a given year (e.g., 1901). The browse structure system 102 further determines that the newspaper did not publish an issue in months 3 and 9. Accordingly, the browse structure system 102 generates a binary month encoding 510 with a 1 for each of the published months (1, 2, 4, 5, 6, 7, 8, 10, 11, and 12) and a 0 for each of the unpublished months (3 and 9).

By compressing the month data using this approach, the browse structure system 102 reduces the month data by approximately 92%. To elaborate, a common case of month data includes all 12 months in a year for a newspaper that published every month of a given year. Storing the data for the values of 1, 2, 3, 4, 5, 6, 7, 8, 9, 10, 11, and 12 requires 26 bytes of storage (e.g., to accommodate the necessary bits to represent each of the decimal numbers). However, by utilizing a binary month encoding as described, the browse structure system 102 can store data for all 12 months as 1, 1, 1, 1, 1, 1, 1, 1, 1, 1, 1, 1 which requires only 12 bits. Thus, the browse structure system 102 consumes 2 bytes to store the month data, which is 92% smaller than the 26 bytes required to store the original decimal values.

Figure 6:
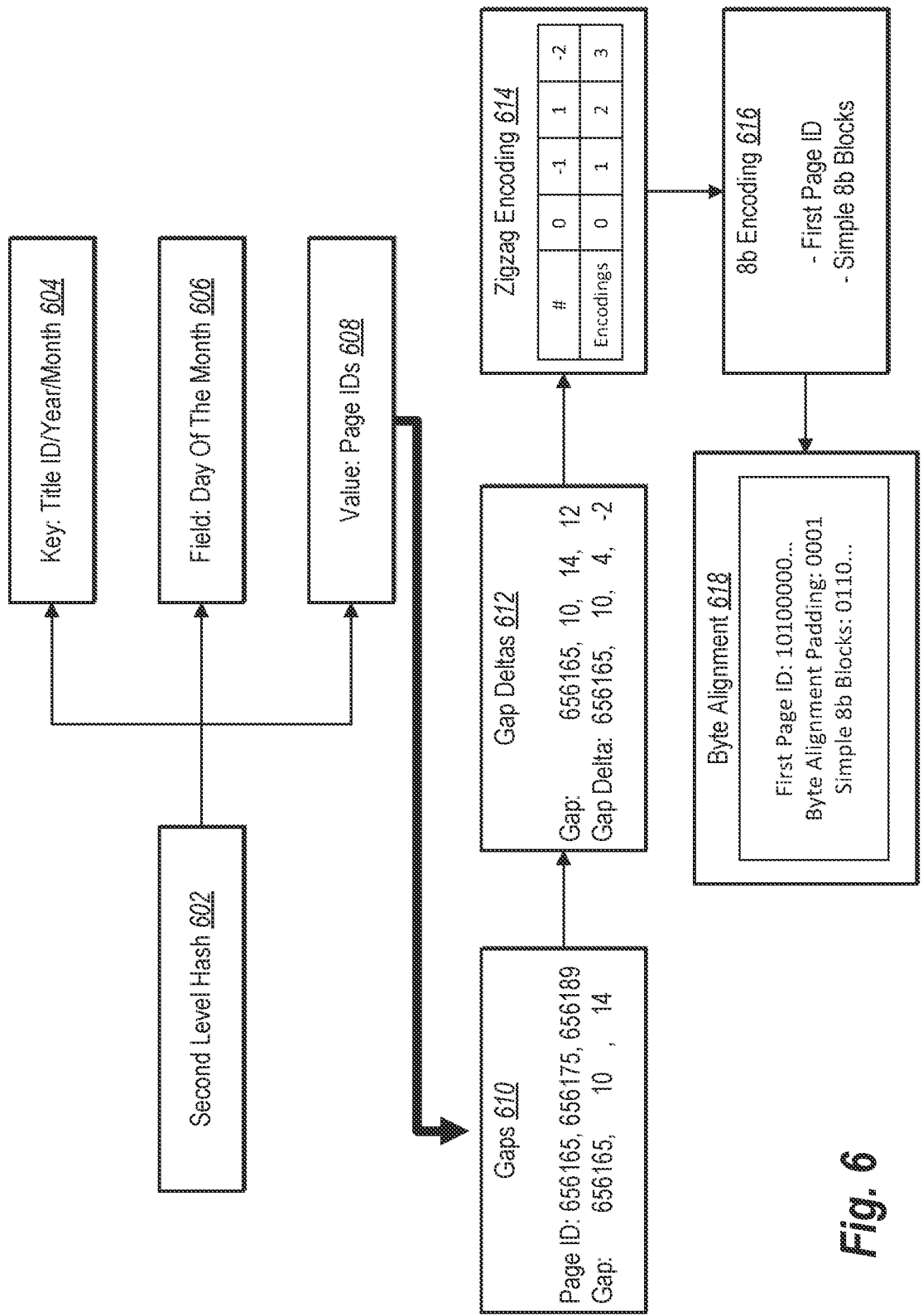
FIG. 6 illustrates an example diagram for compressing page identifier data as part of a multilevel data block in accordance with one or more embodiments.

As noted, in certain embodiments, the browse structure system 102 compresses or encodes page identifier data for a multilevel data block. In particular, the browse structure system 102 encodes page identifier data within a second level hash of a multilevel data block by utilizing a custom compression algorithm. FIG. 6 illustrates an example diagram for compressing page identifier data using a custom compression algorithm in accordance with one or more embodiments.

As illustrated in FIG. 6, the browse structure system 102 identifies or accesses a second level hash 602 of a multilevel data block that includes a key 604, a field 606, and a value 608 (or a set of values). The browse structure system 102 further encodes or compresses the data for the value 608 (or the set of values) using a particular compression algorithm. In some embodiments, the browse structure system 102 utilizes a compression algorithm that includes all of the steps described hereafter. In other embodiments, the browse structure system 102 utilizes a compression algorithm that includes a subset of the steps described hereafter. For example, the browse structure system 102 can compress page identifier data based on gaps without determining gap deltas and/or without zigzag encoding and/or byte alignment. In some cases, the browse structure system 102 can compress page identifier data using gap deltas without zigzag encoding and/or byte alignment. Indeed, the browse structure system 102 can utilize any combination of compression steps described an illustrated in relation to FIG. 6.

As further illustrated in FIG. 6, the browse structure system 102 determines gaps 610 associated with the page identifier data corresponding to the value 608 (or the set of values). For example, the browse structure system 102 determines page gaps indicating numerical differences between successive page identifiers of newspaper images. As shown, the browse structure system 102 determines gaps for a sequence of page identifiers, including: 656165, 656175, and 656189. Indeed, the browse structure system 102 determines gaps by first indicating the initial page identifier and by determining numerical differences for each successive page identifier—e.g., 656165, 10, 14 where 10 indicates the gap between 656165 and 656175 and 14 indicates the gap between 656175 and 656189.

In some cases, newspaper images have page gaps because page identifiers are assigned in sequential order when the newspaper images are uploaded to a database, and multiple devices may be uploading different images for different publications simultaneously, where each upload increments a numerical identifier from the one before such that consecutive pages/images of a single newspaper may have gaps between their page identifier numbers caused by uploads from other devices for other newspapers. Because smaller numbers require less storage space, the browse structure system 102 can reduce the storage requirements of multilevel data blocks by compressing the page identifier data using the gaps 610. Indeed, the browse structure system 102 can utilize SIMPLE-8b encoding to encode the gaps 610 into 64-bit data blocks (e.g., where 4 bits are dedicated to a selector and the remaining 60 bits are used to store the numbers, including the initial page identifier number followed by the gaps). In some cases, compressing the page identifier data using the gaps 610 results in data that is 71% smaller, reducing the size from 24 bytes for storing decimal values of page identifiers to 7 bytes for storing SIMPLE-8b encodings of the gaps 610.

As further illustrated in FIG. 6, the browse structure system 102 can determine gap deltas 612 as part of a compression algorithm. To elaborate, the browse structure system 102 can determine the differences between the gaps 610 and can encode the gap deltas 612 using SIMPLE-8b encoding. For example, the browse structure system 102 can determine an initial page identifier, an initial gap, and subsequent gap deltas that represent changes between successive gaps between page identifiers of consecutive newspaper images. As shown, the browse structure system 102 determines gaps of: 656165 (representing an initial page identifier), 10, 14, and 12. From these gaps the browse structure system 102 determines the gap deltas 612 of 656165 (representing an initial page identifier), 10 (representing an initial gap), 4, and −2, where 4 indicates the difference between the gap of 10 and the gap of 14 and −2 indicates the difference between the gap of 14 and the gap of 12.

In one or more embodiments, the browse structure system 102 resolves negative gap delta values using zigzag encoding 614 as part of a compression algorithm. In particular, because bits represent only positive numbers, the browse structure system 102 encodes the gap deltas 612 using zigzag encoding 614 to eliminate negative values. Specifically, as shown in FIG. 6, the browse structure system 102 encodes gap deltas according to the following table:

| Decimal Value   | 0 | −1 | 1 | −2 |
| --- | --- | --- | --- | --- |
| Zigzag Encoding | 0 | 1  | 2 | 3  | and so on, where each decimal value is encoded into a corresponding zigzag value, thereby eliminating negative values. Using the example above, the browse structure system 102 thus encodes the gap deltas of 656165 (representing an initial page identifier), 10 (representing an initial gap), 4, and −2 into 656165 (representing an initial page identifier), 10 (representing an initial gap), 8, and 3, where 8 is the zigzag encoding of 4 and 3 is the zigzag encoding of −2. By using the gap deltas 612 and the zigzag encoding 614, the browse structure system 102 further reduces the storage size of multilevel data blocks (e.g., because gap deltas are smaller numbers on average than gaps).

As further illustrated in FIG. 6, in some embodiments, the browse structure system 102 determines or generates 8b encodings 618 as part of a compression algorithm. More particularly, the browse structure system 102 stores a page identifier of a first newspaper image using a number of bits (e.g., a set number of bits selected to store the decimal value of an initial page identifier, thus large enough to handle the largest page identifier) and further utilizes a SIMPLE-8b encoding algorithm to encode (the initial gap and) the zigzag encodings 614 into 64-bit data blocks. For example, the browse structure system 102 generates SIMPLE-8b encodings represent the zigzag encodings 614 using (8-bit) blocks.

Additionally, the browse structure system 102 performs a byte alignment 616. To elaborate, the browse structure system 102 corrects byte misalignment (e.g., at byte boundaries) that can result from the 8b encodings 618, where some bits in one or more 8b blocks are unused and could therefore cause errors in interpreting the bits that include garbage data. To align the bits on byte boundaries (e.g., to ensure use of all 8 bits in each byte and prevent garbage data in unused bits), the browse structure system 102 generate and utilize a byte alignment padding. In some cases, the byte alignment padding is a variable-width field that includes a number of bits that matches a number of bits that would otherwise be unused in an 8b encoding. By using a byte alignment padding, the browse structure system 102 generates multilevel data blocks as byte multiples (e.g., multiples of 8 bits) for efficient, accurate storage in an in-memory data server.

Figure 7:
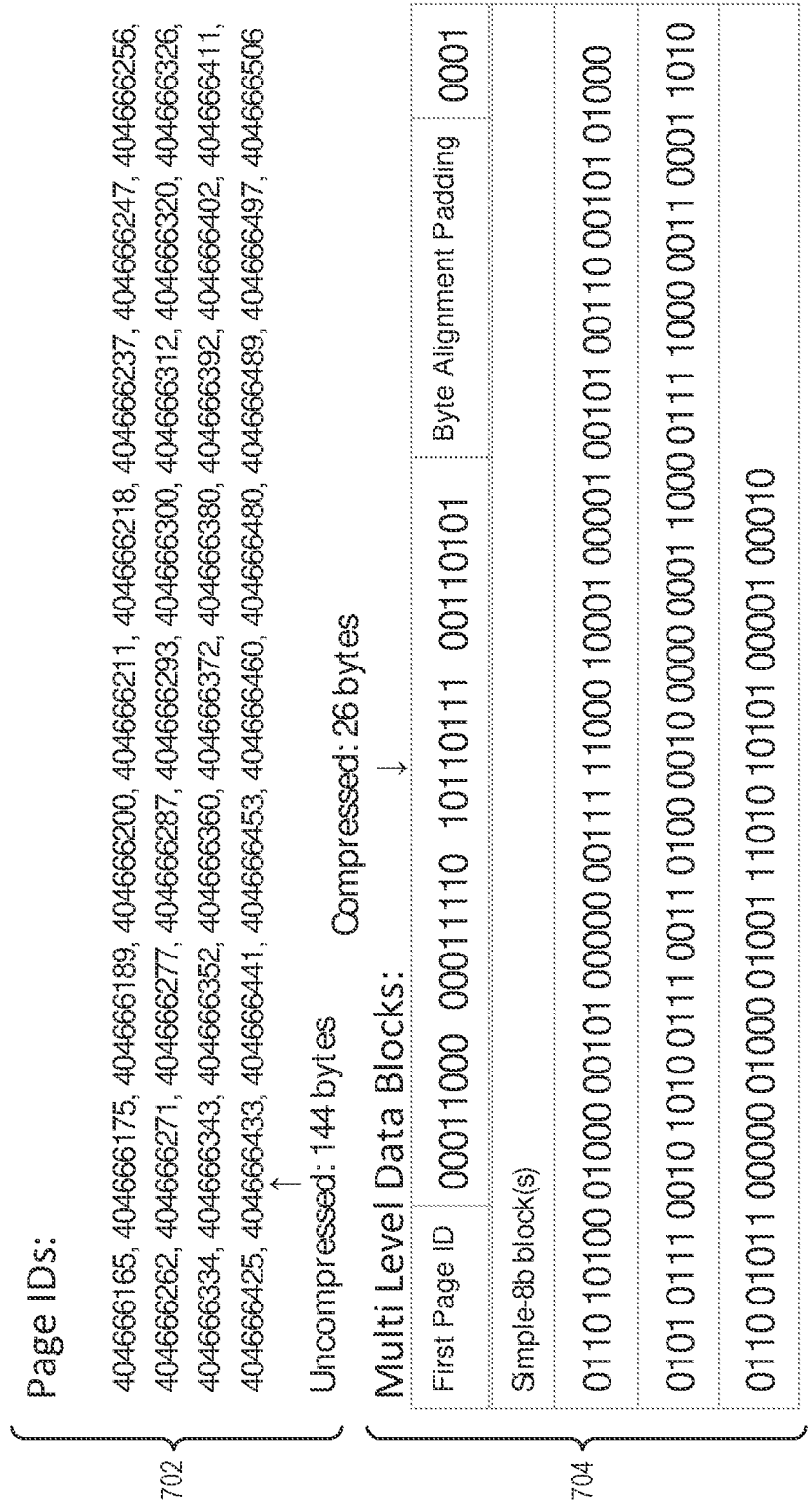
FIG. 7 illustrates an example diagram comparing uncompressed page identifiers and compressed multilevel data blocks in accordance with one or more embodiments.

As mentioned above, in certain embodiments, the browse structure system 102 encodes newspaper images into multilevel data blocks according to an in-memory data structure. In particular, the browse structure system 102 utilizes multiple hash levels and various compression algorithms to generate multilevel data blocks that encode newspaper image data into much smaller data sizes than is achievable in prior systems. FIG. 7 illustrates an example comparison of data sizes between uncompressed page identifiers for newspaper images and multilevel data blocks in accordance with one or more embodiments.

As illustrated in FIG. 7, the browse structure system 102 compresses a list of page identifiers 702 into multilevel data blocks 704. In particular, the browse structure system 102 reduces the data size of the decimal values for the list of page identifiers 702 by performing one or more of the aforementioned compression techniques (e.g., determining gaps, gap deltas, zigzag encodings, 8b encodings, and/or byte alignments) to generate the multilevel data blocks 704. Indeed, while some prior systems consume excessive computer resources storing uncompressed page identifiers, the browse structure system 102 greatly reduces the storage requirements for newspaper images by reducing the storage size of page identifiers approximately 82%. As shown, the browse structure system 102 compresses the list of page identifiers 702 from an initial size of 144 bytes down to a compressed size of 26 bytes in multilevel data blocks 704.

Figure 8A:
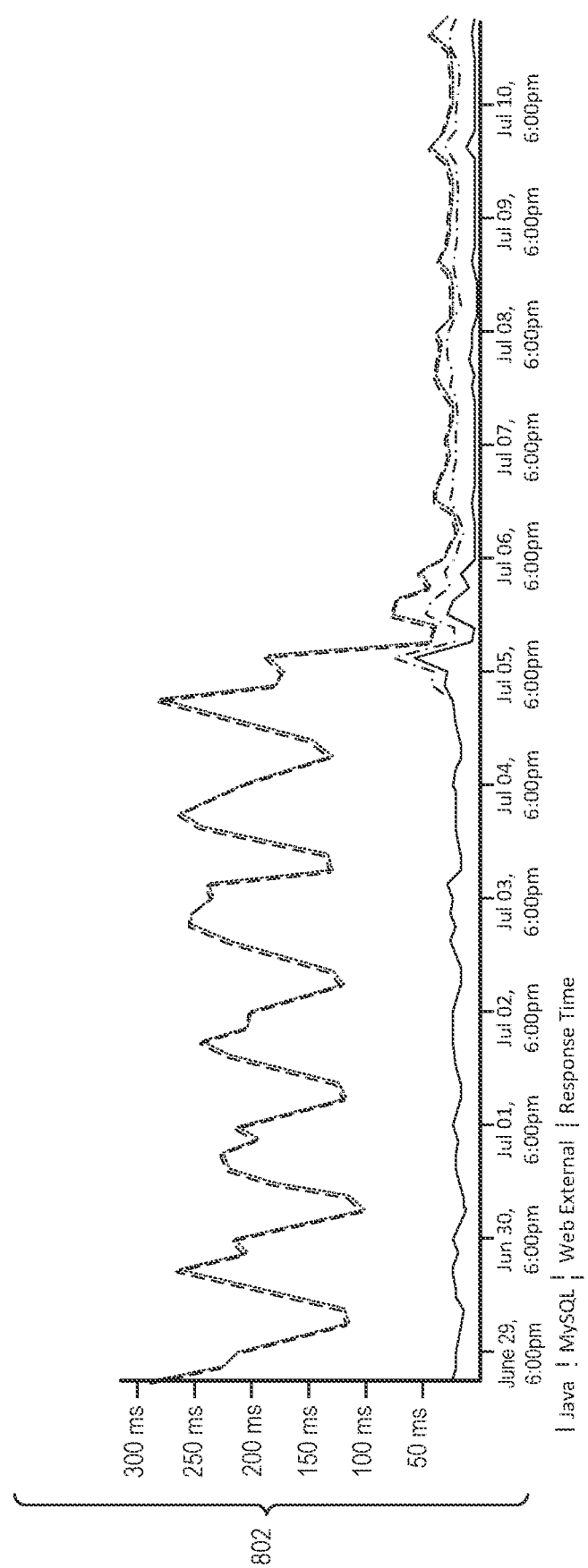
FIGS. 8A-8B illustrate example observations of empirical data demonstrating performance improvements of the browse structure system in accordance with one or more embodiments.
Figure 8B:
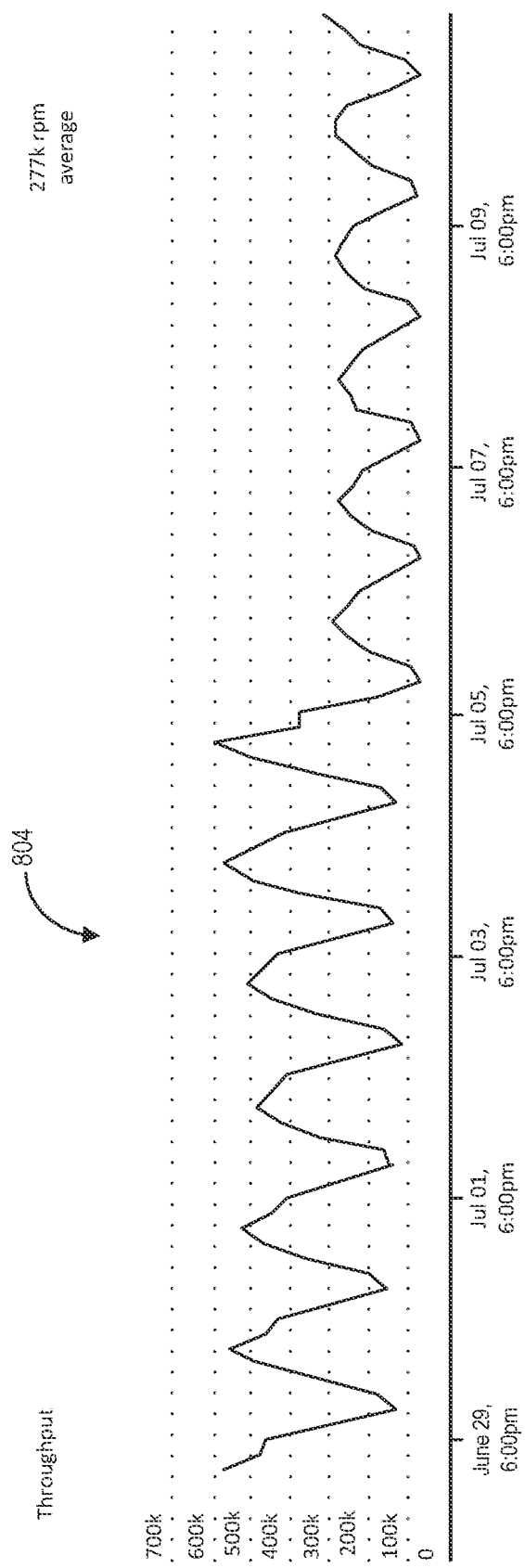

As noted, in certain described embodiments, the browse structure system 102 increases speed and reduces latency in processing browse requests. In particular, by generating and storing multilevel data blocks using in-memory data servers, the browse structure system 102 reduces size and increases access speed for newspaper images within a browse structure. As a result, the browse structure system 102 further relieves computing burdens on servers that previously processed browse requests and search requests. FIGS. 8A-8B illustrate example graphs demonstrating the computational improvements of the browse structure system 102 in accordance with one or more embodiments.

As illustrated in FIG. 8A, the browse structure system 102 greatly reduces network transaction time compared to systems that store uncompressed newspaper image data on disk-based data servers. Indeed, the graph 802 depicts web transaction times for a browse service across a number of days. As shown, the browse structure system 102 implemented the storage of multilevel data blocks on an in-memory data server on July 5. Indeed, experimenters demonstrated or observed a greatly reduced latency in web transactions for browse requests when changing to the multilevel data blocks on an in-memory server. As shown in the graph 802, experimenters observed latencies of nearly 300 ms for browse requests, which the browse structure system 102 reduced to less than 50 ms.

As illustrated in FIG. 8B, the graph 804 depicts observational results demonstrating how the browse structure system 102 also reduces throughput for search servers. Indeed, some prior systems used the same disk-based servers for both search data and browse data. As a result, these servers were often overburdened processing search requests and browse requests. By storing browse structure data in the form of multilevel data blocks to achieve small enough sizes for storage on an in-memory data server that is much faster than disk-based servers, the browse structure system 102 alleviates search server burdens compared to prior systems. As shown, the browse structure system 102 implemented the change to the in-memory data server on July 5, resulting in significantly reduced throughput on search servers.

Figure 9:
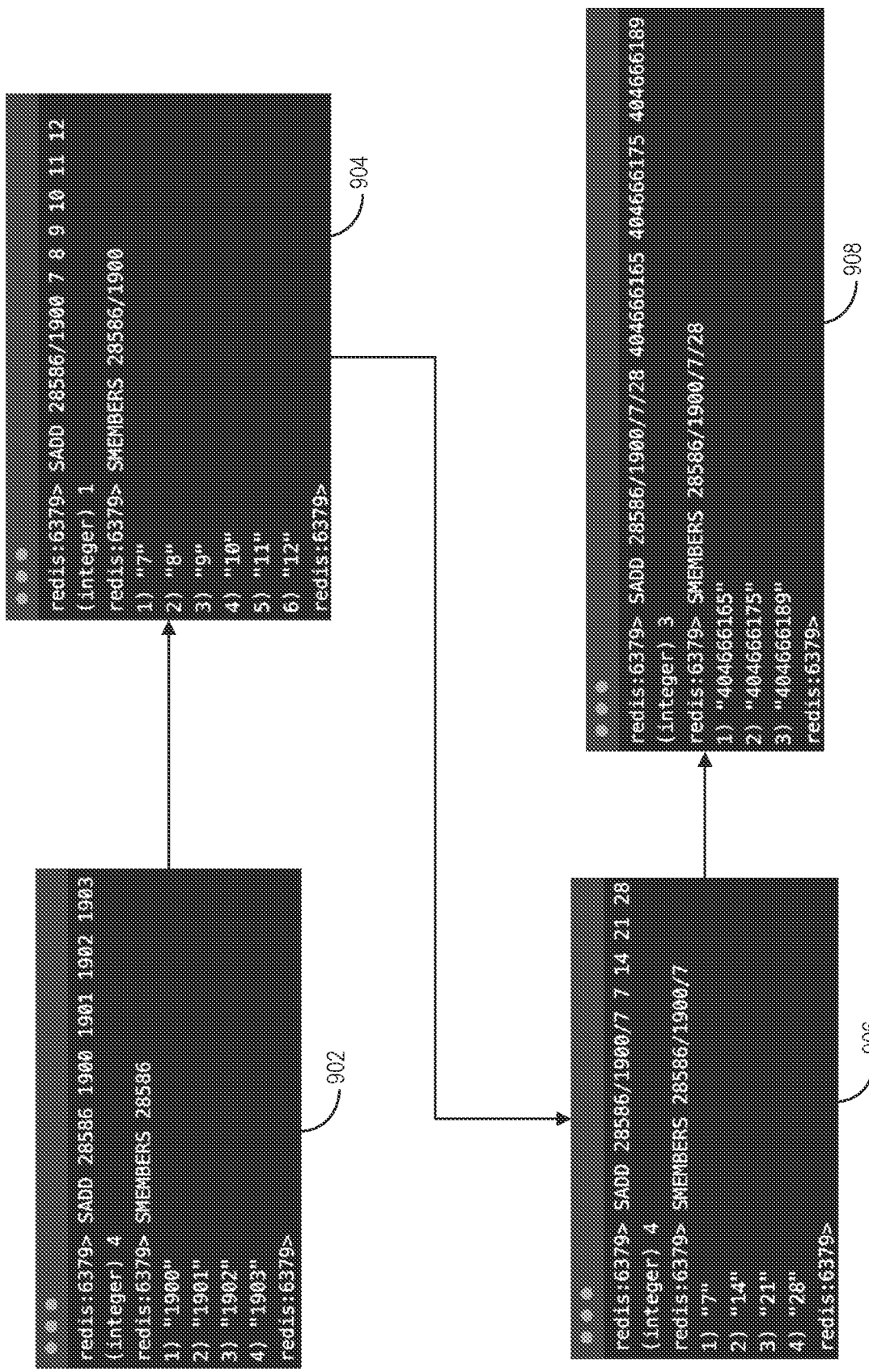
FIG. 9 illustrates an example diagram for generating in-memory sets for storing newspaper image data in accordance with one or more embodiments.

In one or more embodiments, the browse structure system 102 can utilize a different encoding or compression technique to store browse structure data. In particular, the browse structure system 102 can utilize in-memory sets (e.g., REDIS sets) as opposed to multilevel data blocks. FIG. 9 illustrates an example diagram for generating and storing in-memory sets in accordance with one or more embodiments.

As illustrated in FIG. 9, the browse structure system 102 generates in-memory sets using a REDIS architecture. For example, as shown in the box 902, the browse structure system 102 utilizes a SADD (e.g., Set ADD or add-to-set) command to define an in-memory set by adding set members corresponding to a particular set key. As shown, the browse structure system 102 generates a set for a key identifier of 28586 which represents a title identifier for a newspaper publication. Within the set, the browse structure system 102 adds members of 1900, 1901, 1902, and 1903 which represent years of publication for the newspaper corresponding to the 28586 title identifier. As shown, the SMEMBERS command can identify the members within the set.

In addition, as shown in the box 904, the browse structure system 102 generates a month set to store month values. For example, the browse structure system 102 utilizes the SADD command to generate a set with a key of 28586/1900 which represents a combination of the title identifier and the year 1900. Within the set, the browse structure system 102 adds members for each month the newspaper was published in the year 1900 (e.g., 7, 8, 9, 10, 11, and 12). The browse structure system 102 can further generate month sets for other publication years as well.

As further illustrated by the box 906 in FIG. 9, the browse structure system 102 can generate a days set for each month. In particular, the browse structure system 102 can utilize the SADD command to generate a set with a key of 28586/ 1900/7 to represent a combination of the title identifier, the year 1900, and the month 7. Within the set of the specified key, the browse structure system 102 can add members for days or dates on which the newspaper had a publication. For instance, the browse structure system 102 can add members for 7, 14, 21, and 28 to indicate the days of the month within the set. The browse structure system 102 can likewise generate other days sets for other months and/or other years as well.

Additionally, as shown in the box 908, the browse structure system can store page identifiers within page sets or newspaper-image sets. For example, the browse structure system 102 can generate a page set defined by a key of 28586/1900/7/28 which represents a combination of the title identifier, the year 1900, the month 7, and the day 28. Within the indicated set, the browse structure system can add members of 404666165, 404666175, and 404666189 which represent specific page identifiers for newspaper images digitized from a newspaper published on the 28$^{th}$ day of the 7$^{th}$ month in 1900. The browse structure system 102 can further generate additional page sets for other days, months, and/or years.

The components of the browse structure system 102 can include software, hardware, or both. For example, the components of the browse structure system 102 can include one or more instructions stored on a computer-readable storage medium and executable by processors of one or more computing devices. When executed by one or more processors, the computer-executable instructions of the browse structure system 102 can cause a computing device to perform the methods described herein. Alternatively, the components of the browse structure system 102 can comprise hardware, such as a special purpose processing device to perform a certain function or group of functions. Additionally or alternatively, the components of the browse structure system 102 can include a combination of computer-executable instructions and hardware.

Furthermore, the components of the browse structure system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the browse structure system 102 may be implemented as part of a stand-alone application on a personal computing device or a mobile device.

FIGS. 1-9, the corresponding text, and the examples provide a number of different systems and methods for generating and storing compressed newspaper image data using multilevel data blocks (or sets) according to an in-memory data structure. In addition to the foregoing, implementations can also be described in terms of flowcharts comprising acts steps in a method for accomplishing a particular result. For example, FIG. 10 illustrates an example series of acts for generating and storing compressed newspaper image data using multilevel data blocks (or sets) according to an in-memory data structure in accordance with one or more embodiments.

Figure 10:
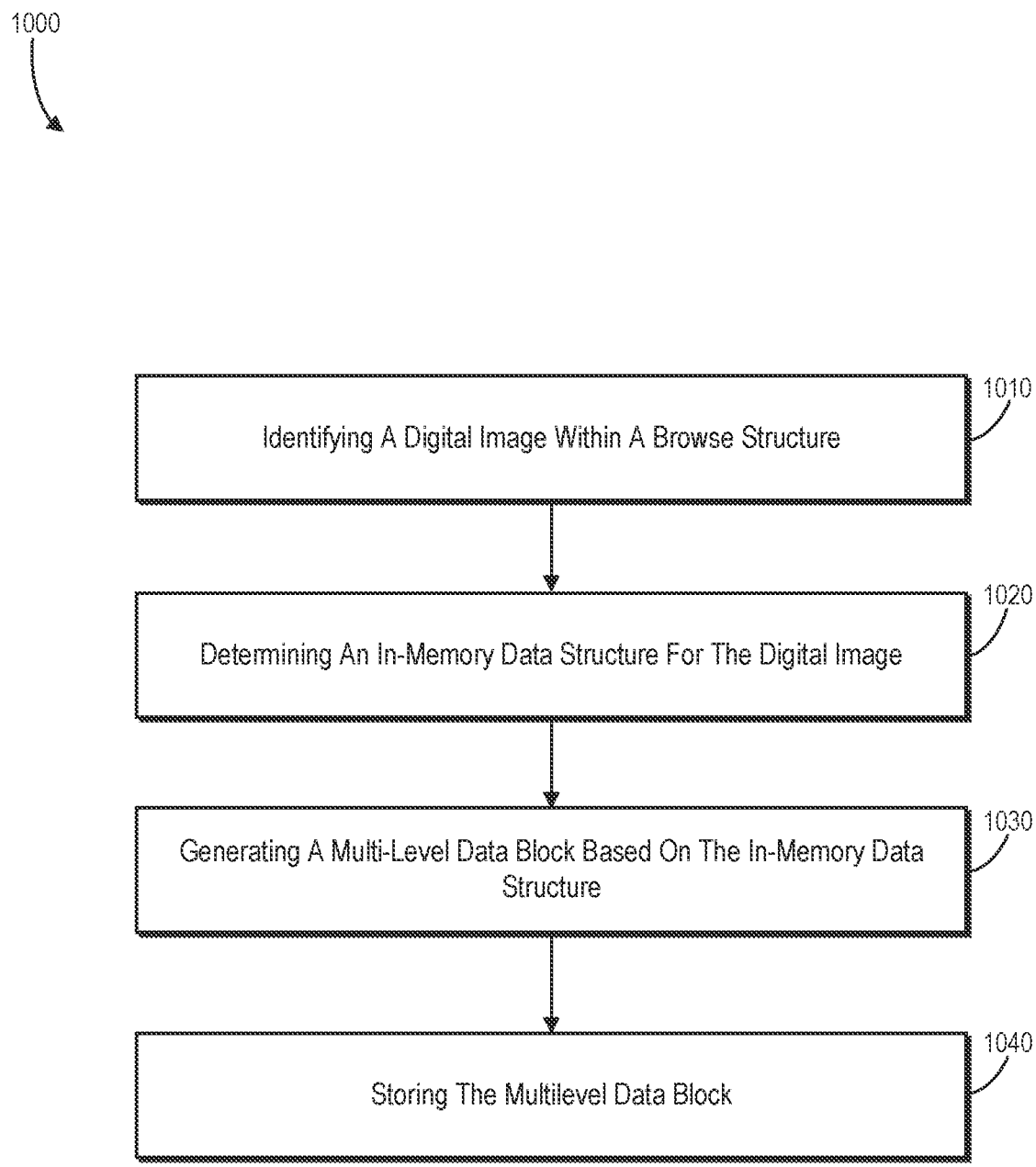
FIG. 10 illustrates a flowchart of a series of acts for generating and storing compressed newspaper image data using multilevel data blocks (or sets) according to an in-memory data structure in accordance with one or more embodiments.

While FIG. 10 illustrates acts according to certain implementations, alternative implementations may omit, add to, reorder, and/or modify any of the acts shown in FIG. 10. The acts of FIG. 10 can be performed as part of a method. Alternatively, a non-transitory computer-readable medium can comprise instructions, that when executed by one or more processors, cause a computing device to perform the acts of FIG. 10. In still further implementations, a system can perform the acts of FIG. 10.

As illustrated in FIG. 10, the series of acts 1000 includes acts 1010-1040. In particular the act 1010 includes identifying a digital image within a browse structure. For example, the act 1010 involves identifying a digital image (e.g., a newspaper image) as part of a browse structure comprising a hierarchy of nested categories for browsing digital images (e.g., newspaper images). In addition, the act 1020 includes determining an in-memory data structure for the digital image (e.g., the newspaper image). For example, the act 1020 involves determining, based on the browse structure, an in-memory data structure for storing the digital image (e.g., the newspaper image) within a digital image database (e.g., a newspaper image database). Further, the act 1030 includes generating a multilevel data block based on the in-memory data structure. For example, the act 1030 involves generating, based on the in-memory data structure, a multilevel data block representing the digital image (e.g., the newspaper image). Additionally, the act 1040 includes storing the multilevel data block. For example, the act 1040 involves storing the multilevel data block within the digital image database (e.g., the newspaper image database).

In some embodiments, the series of acts 1000 includes an act of determining the in-memory data structure by determining a multilevel data hash that includes: a first level hash that includes a first key, a first field, and a first value for mapping a first set of levels within the hierarchy of nested categories within the browse structure and a second level hash that includes a second key, a second field, and a second value for mapping a second set of levels within the hierarchy of nested categories within the browse structure. In addition, the series of acts 1000 can include an act of generating the multilevel data block by encoding month data for the newspaper image using binary encodings to indicate months corresponding to the newspaper image.

In certain embodiments, the series of acts 1000 includes an act of generating the multilevel data block by compressing page identification data for the newspaper image using gaps between page identifiers corresponding to newspaper images. In these or other embodiments, the series of acts 1000 includes an act of generating the multilevel data block by compressing page identification data for the newspaper image by: determining gap deltas indicating differences between page gaps that indicate numerical differences between consecutive page identifiers for newspaper images and encoding the gap deltas using zigzag encoding.

Additionally, the series of acts 1000 can include an act of generating the multilevel data block by aligning bytes of the multilevel data block using a byte alignment padding. Further, the series of acts 1000 can include an act of storing the multilevel data block within the newspaper image database by storing the multilevel data block within a repository of multilevel data blocks for a plurality of newspaper images housed at a single in-memory data server. In some cases, the series of acts 1000 includes an act of generating the multilevel data block by: determining a gap between a numerical identifier for the digital image and another numerical identifier for another digital image and encoding the gap using a binary encoding within the multilevel data block.

In one or more embodiments, the series of acts 1000 includes an act of generating the multilevel data block by: determining gap deltas indicating differences between page gaps that indicate numerical differences between consecutive page identifiers for digital images and encoding the gap deltas using zigzag encoding to remove negative values within the gap deltas. Further, the series of acts 1000 can include an act of resolving byte boundary misalignment within the multilevel data block using a byte alignment padding. The series of acts 1000 can also include an act of generating the multilevel data block by encoding month data for the digital image using binary encodings for months corresponding to the digital image.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
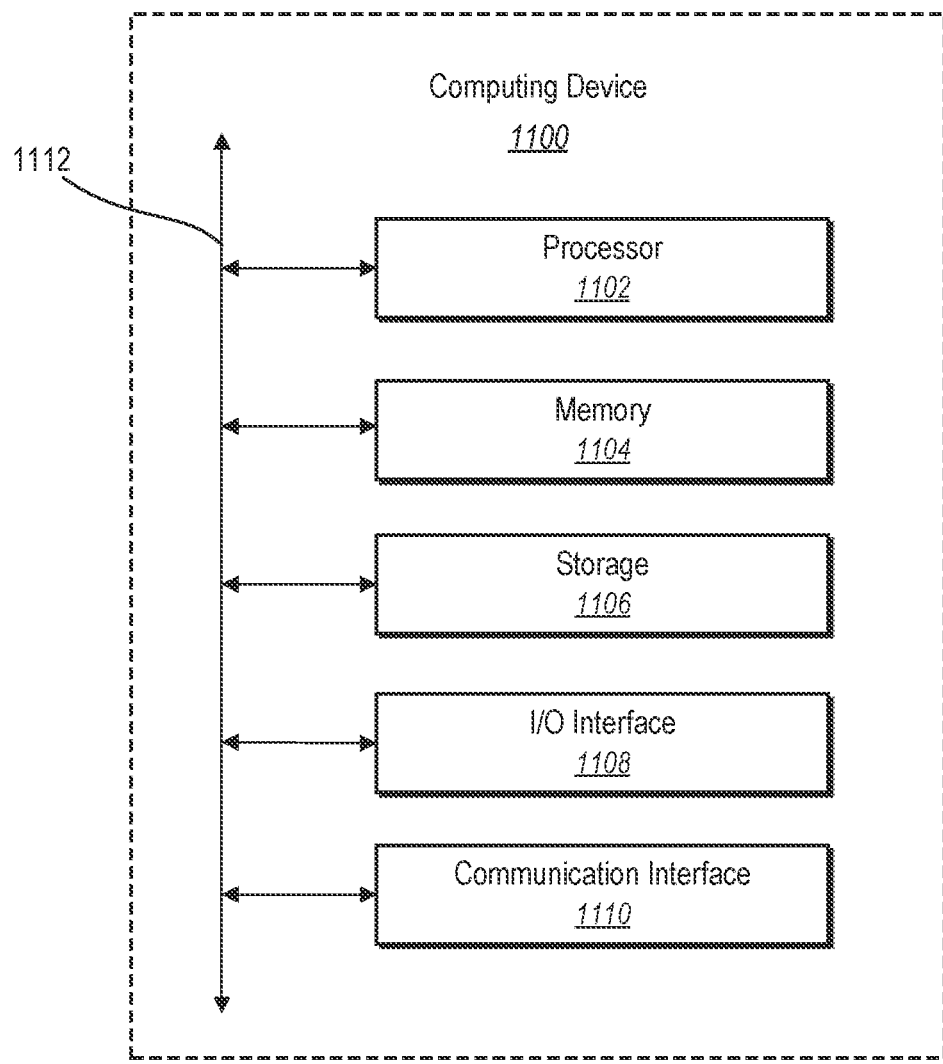
FIG. 11 illustrates a block diagram of an example computing device for implementing one or more embodiments of the present disclosure.

FIG. 11 illustrates a block diagram of exemplary computing device 1100 (e.g., the server(s) 104 and/or the client device 108) that may be configured to perform one or more of the processes described above. One will appreciate that server(s) 104 and/or the client device 108 may comprise one or more computing devices such as computing device 1100. As shown by FIG. 11, computing device 1100 can comprise processor 1102, memory 1104, storage device 1106, I/O interface 1108, and communication interface 1110, which may be communicatively coupled by way of communication infrastructure 1112. While an exemplary computing device 1100 is shown in FIG. 11, the components illustrated in FIG. 11 are not intended to be limiting. Additional or alternative components may be used in other implementations. Furthermore, in certain implementations, computing device 1100 can include fewer components than those shown in FIG. 11. Components of computing device 1100 shown in FIG. 11 will now be described in additional detail.

In particular implementations, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage device 1106 and decode and execute them. In particular implementations, processor 1102 may include one or more internal caches for data, instructions, or addresses. As an example and not by way of limitation, processor 1102 may include one or more instruction caches, one or more data caches, and one or more translation lookaside buffers (TLBs). Instructions in the instruction caches may be copies of instructions in memory 1104 or storage device 1106.

Memory 1104 may be used for storing data, metadata, and programs for execution by the processor(s). Memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1104 may be internal or distributed memory.

Storage device 1106 includes storage for storing data or instructions. As an example and not by way of limitation, storage device 1106 can comprise a non-transitory storage medium described above. Storage device 1106 may include a hard disk drive (HDD), a floppy disk drive, flash memory, an optical disc, a magneto-optical disc, magnetic tape, or a Universal Serial Bus (USB) drive or a combination of two or more of these. Storage device 1106 may include removable or non-removable (or fixed) media, where appropriate. Storage device 1106 may be internal or external to computing device 1100. In particular implementations, storage device 1106 is non-volatile, solid-state memory. In other implementations, Storage device 1106 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1108 allows a user to provide input to, receive output from, and otherwise transfer data to and receive data from computing device 1100. I/O interface 1108 may include a mouse, a keypad or a keyboard, a touch screen, a camera, an optical scanner, network interface, modem, other known I/O devices or a combination of such I/O interfaces. I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1108 is configured to provide graphical data to a display for presentation to a user. The graphical data may be representative of one or more graphical user interfaces and/or any other graphical content as may serve a particular implementation.

Communication interface 1110 can include hardware, software, or both. In any event, communication interface 1110 can provide one or more interfaces for communication (such as, for example, packet-based communication) between computing device 1100 and one or more other computing devices or networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1110 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1110 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1110 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1112 may include hardware, software, or both that couples components of computing device 1100 to each other. As an example and not by way of limitation, communication infrastructure 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 12:
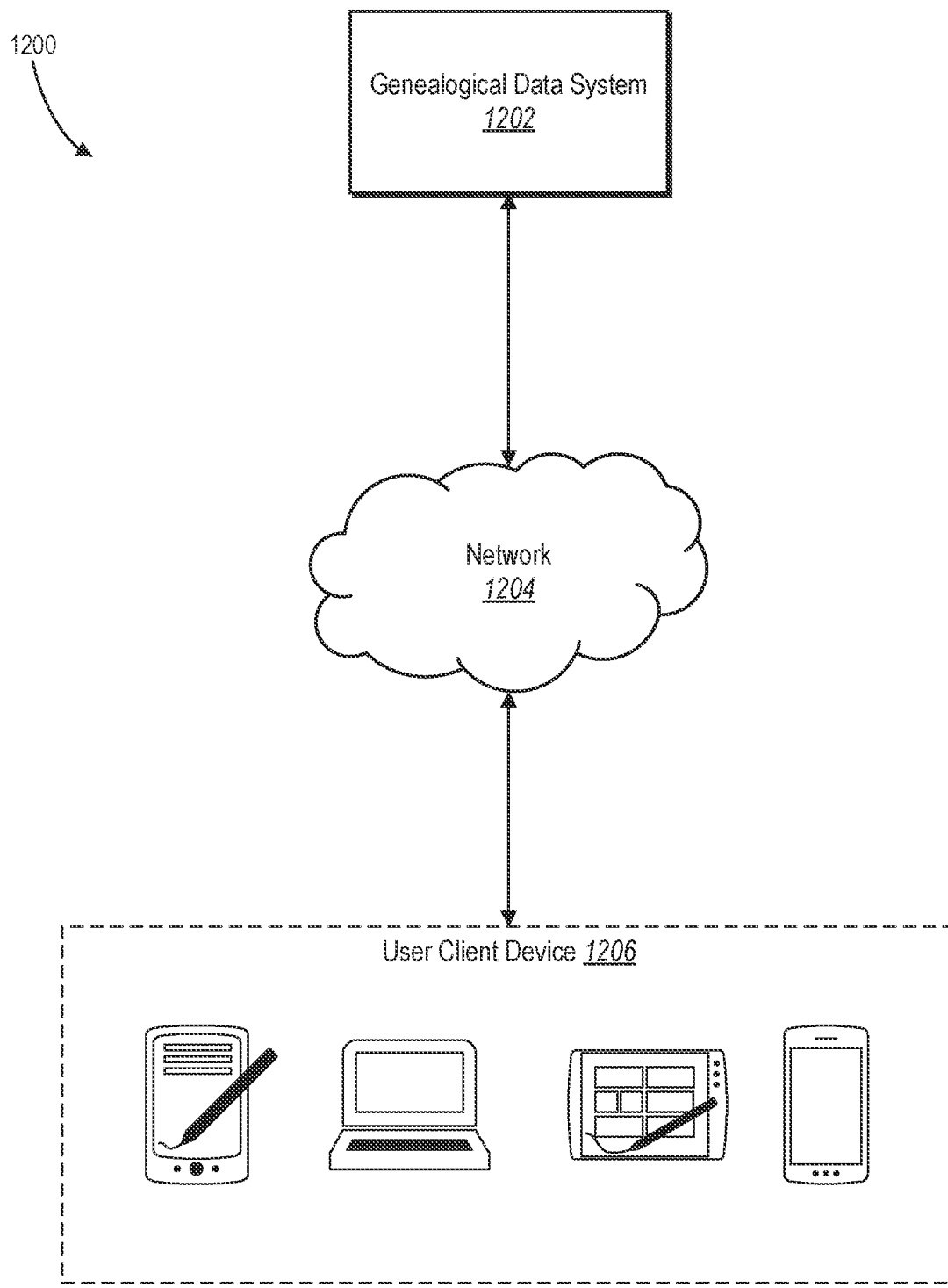
FIG. 12 illustrates a networking environment of a genealogical data system in accordance with one or more embodiments.

FIG. 12 is a schematic diagram illustrating environment 1200 within which one or more implementations of the browse structure system 102 can be implemented. For example, the browse structure system 102 may be part of a genealogical data system 1202 (e.g., the genealogical data system 106). The genealogical data system 1202 may generate, store, manage, receive, and send digital content (such as genealogical content items). For example, genealogical data system 1202 may send and receive digital content to and from client devices 1206 by way of network 1204. In particular, genealogical data system 1202 can store and manage genealogical databases for various user accounts, historical records, and genealogy trees. In some embodiments, the genealogical data system 1202 can manage the distribution and sharing of digital content between computing devices associated with user accounts. For instance, the genealogical data system 1202 can facilitate a user account sharing a genealogical content item with another user account of genealogical data system 1202.

In particular, the genealogical data system 1202 can manage synchronizing digital content across multiple client devices 1206 associated with one or more user accounts. For example, a user may edit a digitized historical document or a node within a genealogy tree using client device 1206. The genealogical data system 1202 can cause client device 1206 to send the edited genealogical content to the genealogical data system 1202, whereupon the genealogical data system 1202 synchronizes the genealogical content on one or more additional computing devices.

As shown, the client device 1206 may be a desktop computer, a laptop computer, a tablet computer, an augmented reality device, a virtual reality device, a personal digital assistant (PDA), an in- or out-of-car navigation system, a handheld device, a smart phone or other cellular or mobile phone, or a mobile gaming device, other mobile device, or other suitable computing devices. The client device 1206 may execute one or more client applications, such as a web browser (e.g., Microsoft Windows Internet Explorer, Mozilla Firefox, Apple Safari, Google Chrome, Opera, etc.) or a native or special-purpose client application (e.g., Ancestry: Family History & DNA for iPhone or iPad, Ancestry: Family History & DNA for Android, etc.), to access and view content over the network 1204.

The network 1204 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1206 may access genealogical data system 1202.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   identifying a newspaper image as part of a browse structure comprising a hierarchy of nested categories for browsing newspaper images;
   determining, based on the browse structure, an in-memory data structure for storing the newspaper image within a newspaper image database;
   generating, based on the in-memory data structure, a multilevel data block representing the newspaper image, wherein generating the multilevel data block comprises compressing page identification data for the newspaper image using gaps between page identifiers corresponding to newspaper images; and
   storing the multilevel data block within the newspaper image database.

2. The computer-implemented method of claim 1, wherein determining the in-memory data structure comprises determining a multilevel data hash comprising:
   a first level hash that includes a first key, a first field, and a first value for mapping a first set of levels within the hierarchy of nested categories within the browse structure; and
   a second level hash that includes a second key, a second field, and a second value for mapping a second set of levels within the hierarchy of nested categories within the browse structure.

3. The computer-implemented method of claim 1, wherein generating the multilevel data block comprises encoding month data for the newspaper image using binary encodings to indicate months corresponding to the newspaper image.

4. The computer-implemented method of claim 1, wherein generating the multilevel data block comprises:
   determining a gap between a numerical identifier for the newspaper image and another numerical identifier for another newspaper image; and
   encoding the gap using a binary encoding within the multilevel data block.

5. The computer-implemented method of claim 1, wherein generating the multilevel data block comprises compressing page identification data for the newspaper image by:

determining gap deltas indicating differences between the gaps between the page identifiers that indicate numerical differences between consecutive page identifiers for newspaper images; and encoding the gap deltas using zigzag encoding.

6. The computer-implemented method of claim 1, wherein generating the multilevel data block comprises aligning bytes of the multilevel data block using a byte alignment padding.

7. The computer-implemented method of claim 1, wherein storing the multilevel data block within the newspaper image database comprises storing the multilevel data block within a repository of multilevel data blocks for a plurality of newspaper images housed at a single in-memory data server.

8. A non-transitory computer readable medium storing instructions which, when executed by at least one processor, cause the at least one processor to:

identify a digital image as part of a browse structure comprising a hierarchy of nested categories for browsing digital images;

determine, based on the browse structure, an in-memory data structure for storing the digital image within a digital image database;

generate, based on the in-memory data structure, a multilevel data block representing the digital image, wherein generating the multilevel data block comprises compressing page identification data for the digital image by encoding the page identification data with gap data indicating gaps between page identifiers corresponding to digital images; and store the multilevel data block within the digital image database.

9. The non-transitory computer readable medium of claim 8, further storing instructions which, when executed by the at least one processor, cause the at least one processor to determine the in-memory data structure for storing the digital image by determining a multilevel data hash comprising:

a first level hash that includes a first key, a first field, and a first value for mapping a first set of levels within the hierarchy of nested categories within the browse structure; and a second level hash that includes a second key, a second field, and a second value for mapping a second set of levels within the hierarchy of nested categories within the browse structure.

10. The non-transitory computer readable medium of claim 9, further storing instructions which, when executed by the at least one processor, cause the at least one processor to generate the multilevel data block by:

determining a gap between a numerical identifier for the digital image and another numerical identifier for another digital image; and encoding the gap using a binary encoding within the multilevel data block.

11. The non-transitory computer readable medium of claim 8, further storing instructions which, when executed by the at least one processor, cause the at least one processor to generate the multilevel data block by:

determining gap deltas indicating differences between the gaps between the page identifiers that indicate numerical differences between consecutive page identifiers for digital images; and encoding the gap deltas using zigzag encoding to remove negative values within the gap deltas.

12. The non-transitory computer readable medium of claim 8, further storing instructions which, when executed by the at least one processor, cause the at least one processor to resolve byte boundary misalignment within the multilevel data block using a byte alignment padding.

13. The non-transitory computer readable medium of claim 8, further storing instructions which, when executed by the at least one processor, cause the at least one processor to generate the multilevel data block by encoding month data for the digital image using binary encodings for months corresponding to the digital image.

14. The non-transitory computer readable medium of claim 8, further storing instructions which, when executed by the at least one processor, cause the at least one processor to store the multilevel data block within the digital image database by storing the multilevel data block within a repository of multilevel data blocks for a plurality of digital images housed at a single in-memory data server.

15. A system comprising:

at least one processor; and a non-transitory computer readable medium storing instructions which, when executed by the at least one processor, cause the system to:

identify a newspaper image as part of a browse structure comprising a hierarchy of nested categories for browsing newspaper images;

determine, based on the browse structure, an in-memory data structure for storing the newspaper image within a newspaper image database;

generate, based on the in-memory data structure, a multilevel data block representing the newspaper image by:

compressing page identification data for the newspaper image using gaps between page identifiers corresponding to newspaper images; and aligning bytes of the multilevel data block using a byte alignment padding; and store the multilevel data block within the newspaper image database.

16. The system of claim 15, further storing instructions which, when executed by the at least one processor, cause the system to determine the in-memory data structure by determining a multilevel data hash comprising:

a first level hash that includes a first key, a first field, and a first value for mapping a first set of levels within the hierarchy of nested categories within the browse structure; and a second level hash that includes a second key, a second field, and a second value for mapping a second set of levels within the hierarchy of nested categories within the browse structure.

17. The system of claim 15, further storing instructions which, when executed by the at least one processor, cause the system to generate the multilevel data block by encoding month data for the newspaper image using binary encodings to indicate which months correspond to the newspaper image.

18. The system of claim 15, further storing instructions which, when executed by the at least one processor, cause the system to generate the multilevel data block by:

determining a gap between a numerical identifier for the newspaper image and another numerical identifier for another newspaper image; and encoding the gap using a binary encoding within the multilevel data block.

19. The system of claim 15, further storing instructions which, when executed by the at least one processor, cause the system to generate the multilevel data block by compressing page identification data for the newspaper image by:
- determining gap deltas indicating differences between the gaps between the page identifiers that indicate numerical differences between consecutive page identifiers for newspaper images; and
- encoding the gap deltas using zigzag encoding.

20. The system of claim 15, further storing instructions which, when executed by the at least one processor, cause the system to store the multilevel data block within the newspaper image database by storing the multilevel data block within a repository of multilevel data blocks for a plurality of newspaper images housed at a single in-memory data server.

* * * * *